United States Patent
Choi et al.

(10) Patent No.: US 6,934,526 B2
(45) Date of Patent: Aug. 23, 2005

(54) METHOD FOR CONTROLLING TRANSMISSION POINT OF A DEDICATED CHANNEL IN A CDMA COMMUNICATION SYSTEM SUPPORTING AN UPLINK SYNCHRONOUS TRANSMISSION SCHEME

(75) Inventors: Sung-Ho Choi, Songnam-shi (KR); Hyun-Woo Lee, Suwon-shi (KR); Seong-Il Park, Kunpo-shi (KR); Ho-Kyu Choi, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 501 days.

(21) Appl. No.: 10/080,992

(22) Filed: Feb. 21, 2002

(65) Prior Publication Data

US 2002/0160744 A1 Oct. 31, 2002

(30) Foreign Application Priority Data

Feb. 21, 2001 (KR) ....................................... 2001-10952

(51) Int. Cl.$^7$ ................................................. H04Q 7/20
(52) U.S. Cl. ........................ 455/403; 455/560; 370/331
(58) Field of Search ................................ 455/403, 522, 455/456, 502, 436–440, 560–561; 370/320, 324, 330–331, 278, 280–282, 350

(56) References Cited

U.S. PATENT DOCUMENTS

| | | | | |
|---|---|---|---|---|
| 6,332,085 B1 | * | 12/2001 | Hanson et al. | 455/557 |
| 6,456,826 B1 | * | 9/2002 | Toskala et al. | 455/63.1 |
| 6,564,067 B1 | * | 5/2003 | Agin | 455/522 |
| 6,594,473 B1 | * | 7/2003 | Dabak et al. | 455/101 |
| 6,650,905 B1 | * | 11/2003 | Toskala et al. | 455/522 |
| 6,657,988 B2 | * | 12/2003 | Toskala et al. | 370/350 |
| 6,681,099 B1 | * | 1/2004 | Keranen et al. | 455/67.16 |
| 6,728,550 B1 | * | 4/2004 | Bohnke et al. | 455/522 |
| 2002/0045448 A1 | * | 4/2002 | Park et al. | 455/436 |
| 2002/0045451 A1 | * | 4/2002 | Hwang et al. | 455/442 |

* cited by examiner

*Primary Examiner*—CongVan Tran
(74) *Attorney, Agent, or Firm*—Dilworth & Barrese LLP

(57) ABSTRACT

Disclosed is provided a method for switching an operation mode from a non-USTS to a USTS mode in a Node B capable of communicating with a UE in both the non-USTS mode and the USTS mode. The Node B calculates a difference value between a start point of a downlink dedicated channel frame in a downlink dedicated channel transmitted to the UE in the non-USTS mode and a start point of an uplink dedicated channel frame in an uplink dedicated channel received from the UE. The Node B determines a first control value for controlling the start point of the uplink dedicated channel frame in the uplink dedicated channel by comparing the difference value with a given reference value, and also determines a second control value such that the second control value for the start point of the downlink dedicated channel frame in the downlink dedicated channel becomes a multiple of a given number of chips. Further, the Node B informs the UE of the determined first and second control values, and then transmits a downlink dedicated channel signal such that the start point of the downlink dedicated channel frame becomes a start point determined based on the second control value.

10 Claims, 17 Drawing Sheets

METHOD FOR CONTROLLING TRANSMISSION POINT OF A DEDICATED CHANNEL IN A CDMA COMMUNICATION SYSTEM SUPPORTING AN UPLINK SYNCHRONOUS TRANSMISSION SCHEME

PRIORITY

This application claims priority to an application entitled "Method for Controlling Transmission Point of a Dedicated Channel in a CDMA Communication System Supporting an Uplink Synchronous Transmission Scheme" filed in the Korean Industrial Property Office on Feb. 21, 2001 and assigned Serial No. 2001-10952, the contents of which are hereby incorporated by reference.

BACKGROUND OF THE INVENTION

1. Field of the Invention

The present invention relates generally to a CDMA (Code Division Multiple Access) communication system, and in particular, to a method for varying a transmission point of a dedicated channel in a CDMA communication system supporting an uplink synchronous transmission scheme (USTS).

2. Description of the Related Art

A CDMA (Code Division Multiple Access) mobile communication system is divided into a synchronous system and an asynchronous system. Such a CDMA communication system uses orthogonal codes to separate channels. Herein, a description of the invention will be made with reference to an asynchronous W-CDMA (Wideband-CDMA) communication system, also known as a UMTS (Universal Mobile Telecommunications System) communication system. However, the invention can also be applied to different CDMA systems such as the CDMA-2000 system, as well as the W-CDMA system.

The W-CDMA communication system employs an uplink synchronous transmission scheme (USTS) in which a Node B communicates with a plurality of UEs (User Equipments) through radio links formed between them while maintaining an orthogonal property among the signals received from the respective UEs. For the USTS, the Node B transmits a control signal to the UEs so that the respective UEs can transmit their signals at a proper time to maintain the orthogonal property among the UEs. Upon receipt of the control signal, the UEs align a transmission point of the uplink signals.

FIG. 1 illustrates architecture of a conventional W-CDMA communication system. As illustrated, a radio network controller (RNC) controls a process for connecting the UE. Further, the RNC manages assignment of channel resources to the UEs connected to one or more Node Bs. The Node Bs and the RNC constitute a UTRAN (UMTS Terrestrial Radio Access Network).

When successfully connected to the Node B through the channel assigned by the RNC, the UE maintains communication using the assigned downlink or uplink dedicated physical channel (DPCH). The W-CDMA communication system employs an asynchronous system in which the UEs are not synchronized with the Node B. The RNC can communication with a plurality of UEs through the Node B. In this case, the UE scrambles its transmission data using a unique scrambling code and transmits the scrambled data as an uplink signal, so that the Node B can distinguish the uplink signals received from the respective UEs.

The scrambling code is classified into a long scrambling code and a short scrambling code. In the following description, the "scrambling code" will refer to the long scrambling code.

The scrambling code is created in the following process of:

(Step 1) receiving 24 initial values $n0, n1, \ldots, n23$, (Step 2) creating sequences $x(i)$ and $y(i)$, where $i=0, \ldots, 2^{25}-27$, $x(0)=n0, x(1)=n1, x(2)=n2, \ldots, x(23)=n23, x(24)=1$ $x(i+25)=x(i+3)+x(i)$ modulo 2, $i=0, \ldots, 2^{25}-27$ $y(0)=y(1)=y(2)=\ldots=y(23)=y(24)=1$ $y(i+25)=y(i+3)+y(i+2)+y(i+2)+y(i)$ modulo 2, $i=0, \ldots, 2^{25}-27$ (Step 3) creating a sequence $z(i)$, where $i=0, \ldots, 2^{25}-2$, $z(i)=x(i)+y(i)$ modulo 2, $i=0, \ldots, 2^{25}-2$, (Step 4) creating a Gold sequence $Z(i)$, where $i=0, \ldots, 2^{25}-2$, $Z(i)=1-2*z(i)$ (Step 5) creating two real scrambling codes $c1(i)$ and $c2(i)$, where $i=0, \ldots, 2^{25}-2$, $c1(i)=Z(i)$ $c2(i)=Z((i+16777232)$ modulo $(2^{25}-1))$, (Step 6) creating a scrambling code $C(i)$, where $i=0, \ldots, 2^{25}-2$, $C(i)=c1(i)*(1+j(-1)^i*c2(2*\lfloor i/2 \rfloor))$.

In the above formula, $\lfloor i/2 \rfloor$ indicates the largest one of integers less than or equal to $i/2$.

In the W-CDMA communication system, one frame is comprised of 38400 chips. Therefore, the scrambling code is used in a unit of 38400 chips. That is, a scrambling code for one DPCH is $C(i)$, where $i=0,1, \ldots, 38399$.

A DPCH frame signal is scrambled using the scrambling codes $C(0)$ to $C(38399)$. The respective UEs create the scrambling codes using different initial values $n0, n1, \ldots, n23$, and then, scramble the DPCH signals with the created scrambling codes before transmission. The Node B then descrambles the signals received from the UEs using the scrambling codes uniquely assigned to the respective UEs, thereby distinguishing the signals from the respective UEs.

The latest W-CDMA communication system uses OVSF (Orthogonal Variable Spreading Factor) codes for channel separation. In the case of the downlink, the Node B can distinguish the downlink DPCH (DL DPCH) signals transmitted to the different UEs using the OVSF codes. The Node B spreads the DL DPCH signals using the OVSF codes uniquely assigned to the respective UEs, sums up the spread DL DPCH signals, scrambles the summed DL DPCH signal with its unique scrambling code, and then transmits the scrambled DL DPCH signal. The respective DPCHs may have different data rates. In the case of the uplink, the UE spreads a DPDCH (Dedicated Physical Data CHannel) signal and a DPCCH (Dedicated Physical Control CHannel) signal constituting a DPCH signal, using different OVSF codes, and scrambles the spread DPDCH and DPCCH signals with its unique scrambling code before transmission.

The OVSF codes used by the UE to spread the DPDCH and DPCCH signals may also be identical to each other. Since the UEs transmit the signals using the different scrambling codes, the Node B can distinguish the signals received from the respective UEs.

The UE employing the USTS scrambles the DPDCH signal and the DPCCH signal spread with the different OVSF codes using an uplink scrambling code commonly used by the UEs in a cell where it is located, instead of using its unique scrambling code, and transmits the scrambled signals. Further, the UE employing the USTS spreads DPDCH signal and the DPCCH signal with a unique OVSF code, i.e., a channelization code, assigned from the Node B, and transmits the spread signals. The Node B then despreads the signals received from the respective UEs using the OVSF codes uniquely assigned to the UEs, thereby distinguishing the received signals.

In addition, the W-CDMA communication system transmits the respective DL DPCH signals with different time offsets, in order to prevent the transmission power from increasing instantaneously when the Node B simultaneously transmits a plurality of downlink DPCH (DL DPCH) signals. By doing so, the uplink DPCH (UL DPCH) signals also arrive at the Node B at different points in time, preventing the Node B from simultaneously processing the signals received from a plurality of UEs, thereby distributing a load of the Node B.

FIG. 2 illustrates the timing relationship between the DL DPCH signal and the UL DPCH signal in the W-CDMA communication system, wherein it is assumed that there is no propagation delay between the Node B and the UEs, i.e., that the UE receives the DL DPCH transmitted by the Node B with no propagation delay and the Node B also receives the UP DPCH transmitted by the UE with no propagation delay. When there exists a propagation delay between the Node B and the UEs, a round trip time (RTT) must be considered. However, since the system will operate in the same manner even though there exists the propagation delay, the round trip time will be assumed to be '0'.

Referring to FIG. 2, one 10-ms frame is comprised of 15 slots, and each slot is comprised of 2560 chips. A common pilot channel (CPICH) and a primary common control physical channel (P-CCPCH) are frame-synchronized with each other, and used as a reference time for other channels.

As illustrated in FIG. 2, the respective DL DPCHs are transmitted with a time offset $\tau_{DPCH,n}$ from the P-CCPCH. The respective DPCHs are given the different time offsets $\tau_{DPCH}$. For example, each DPCH is given one of 0, 256, 2*256, ..., 148*256 and 149*256-chip offsets. That is, the DPCH is given a time offset of a multiple of 256 chips from the reference time.

The UE transmits the UL DPCH after a lapse of a $T_o$ time after receiving the DL DPCH with a time offset $\tau_{DPCH,n}$ from the P-CCPCH. Therefore, the UL DPCHs also have different transmission points, so that the UL DPCH signals arrive at the Node B at the different time points. Due to a distance difference between the Node B and the respective UEs, the Node B may not receive the UL DPCH exactly after a lapse of the $T_o$ time after transmitting the DL DPCH. Therefore, the Node B measures a propagation delay time to the UE in the process of transmitting a random access channel (RACH) in order to measure a distance from the UE, and uses this value in predicting an expected UL DPCH arrival time after transmission of the DL DPCH.

In the USTS mode, a plurality of UEs can communicate with a Node B using the same scrambling code. The USTS is designed to synchronize the UL DPCHs received at the Node B from a plurality of UEs. In the USTS mode, the Node B can assign the same scrambling code to the synchronized UEs. Therefore, the W-CDMA communication system employing the USTS can reduce the number of scrambling codes used in the cell, contributing to a reduction in interference between UE signals. When the UEs employing the USTS use the same scrambling code, the Node B can identify the UEs using channelization codes, i.e., the OVSF codes provided from the RNC. In the USTS mode, the Node B synchronizes the UL DPCHs from at least 2 UEs with each other, and then assigns the same scrambling code to the synchronized UEs. Further, the Node B assigns the different channelization codes (or OVSF codes) to the UL DPCHs of the UEs assigned the same scrambling code, to distinguish the received synchronized UL DPCHs.

The USTS controls a sync time of the signal through the following two processes.

(1) Initial Synchronization Process

Upon receipt of a signal from a UE over the RACH, a Node B measures the difference (offset) between a predetermined reference time and an arrival time of the signal received over the RACH. The Node B transmits the measured time difference to the UE over a forward access channel (FACH). Upon receipt of the time difference over the FACH, the UE aligns its transmission point using the received time difference.

(2) Tracking Process

The Node B transmits a time alignment bit (TAB) to the UE by periodically comparing the arrival time of the UE signal and the reference time. If the TAB is '1', the UE shifts the transmission point ahead by ⅛ chip. However, if the TAB is '0', the UE shifts the transmission point behind by ⅛ chip. The TAB is transmitted once every two frames using a transmit power control (TPC) bit in the control channel.

In the USTS mode where several UEs use the same scrambling code, the uplink frame signals transmitted by the UEs using the same scrambling code must be synchronized with one another at the Node B. That is, when the Node B receives the DPCHs transmitted from several UEs, the received DPCHs must be subjected to both slot synchronization and frame synchronization. The frame synchronization is to minimize interference among the UEs using the same scrambling code, while the slot synchronization is to distinguish the UE signals from each other. The UEs perform spreading using the different OVSF codes and perform scrambling using the same scrambling code, depending on the orthogonal property of the OVSF codes. The Initial Synchronization Process is a process for acquiring the frame synchronization and the slot synchronization.

As described above, the respective DL DPCHs have different time offsets $\tau_{DPCH,n}$. Therefore, the UL DPCHs received at the Node B are not synchronized (or misaligned) with one another. During the Initial Synchronization Process, the misalignment among the UL DPCHs is removed to synchronize the UL DPCHs. Accordingly, there is a demand for a method for resolving the channel misalignment problem in the Initial Synchronization Process.

As stated above, since the USTS synchronizes the uplink within one cell and uses the channelization codes and a specific scrambling code different from a normal DPCH not supporting the USTS service, a special handover method is required. That is, in the case of the normal DPCH, each UE uses a unique uplink scrambling code. However, in the case of the USTS, a plurality of the UEs share the same scrambling code. Further, in the case of the normal DPCH, a node position of an OVSF code for spreading the DPCCH signal is SF256 which is the highest position in the OVSF code tree. However, in the case of the USTS, the node position may be different. In addition, a node position of the OVSF code for spreading the DPDCH may also be different from the node position of the OVSF code in the OVSF code tree, used by the normal DPCH. However, in the case of the USTS, the UE performs special synchronization, so that when the handover is performed in the same method as done by the existing UMTS system, two or more connections operate differently. Therefore, it is not possible to perform a USTS handover using the existing handover method. Thus, there is a demand for a separate handover method.

In addition, there is a demand for a mode switching method for switching an operation mode of the UE to the USTS mode, when the UE, which supports the USTS service but operates in the normal mode or non-USTS mode, enters into coverage of the Node B supporting the USTS service.

Furthermore, it is necessary to control the timing of a signal transmitted from a second Node B to a UE, when the UE moves to the second Node B while communicating with a first Node B employing the USTS, i.e., when the UE transitions from one state where the UE communicates with the first Node B in the USTS node and with the second Node B in the non-USTS mode to another state where the UE communicates with the second Node B in the USTS mode.

SUMMARY OF THE INVENTION

It is, therefore, an object of the present invention to provide a method for performing synchronization in a CDMA communication system employing the USTS.

It is another object of the present invention to provide a method for acquiring frame synchronization and slot synchronization of UL DPCHs from UEs employing the USTS in a CDMA communication system.

It is further another object of the present invention to provide a method for performing a handover in a CDMA communication system employing the USTS.

It is yet another object of the present invention to provide a method for exchanging USTS messages for performing a handover between an RNC and UEs in a CDMA communication system employing the USTS.

It is still another object of the present invention to provide a method for maintaining synchronization between a UE and a Node B during a handover of the UE employing the USTS in a CDMA communication system.

It is still another object of the present invention to provide a method for switching an operation mode of a UE operating in a non-USTS mode to a USTS mode.

It is still another object of the present invention to provide a method for transitioning from one state where a UE communicates with a first Node B in a USTS mode and with a second Node B in a non-USTS mode to another state whether the UE communicates with the second Node B in the USTS mode.

It is still another object of the present invention to provide a method for controlling transmission and reception points of a downlink signal and an uplink signal, if a difference between the transmission and reception points of the downlink signal and the uplink signal exceeds a preset time in a synchronization process, in the case where a UE transitions from a handover state or a state where it communicates in a non-USTS mode to another state where it communicates in a USTS mode.

It is still another object of the present invention to provide a method for controlling a difference between transmission and reception points of downlink and uplink signals for power control in a synchronization process when a UE transitions from a handover state or a state where it communicates in a non-USTS mode to another state where it communicates in a USTS mode.

According to one aspect of the present invention, there is provided a method for switching an operation mode from a non-USTS to a USTS mode in a Node B capable of communicating with a UE in both the non-USTS mode and the USTS mode. The Node B calculates a difference value between a start point of a downlink dedicated channel frame in a downlink dedicated channel transmitted to the UE in the non-USTS mode and a start point of an uplink dedicated channel frame in an uplink dedicated channel received from the UE. The Node B determines a first control value for controlling the start point of the uplink dedicated channel frame in the uplink dedicated channel from the UE by comparing the difference value with a given reference value, and also determines a second control value such that the second control value for the start point of the downlink dedicated channel frame in the downlink dedicated channel of the Node B becomes a multiple of a given number of chips. Further, the Node B informs the UE of the determined first and second control values, and then transmits a downlink dedicated channel signal such that the start point of the downlink dedicated channel frame becomes a start point determined based on the second control value.

According to another aspect of the present invention, there is provided a method for connecting with a Node B in a USTS mode by a UE operating in a non-USTS mode in a cell region of the Node B. The UE receives from the Node B a first control value for controlling a frame start point for an uplink dedicated channel signal and a second control value for controlling a frame start point for a downlink dedicated channel signal. Thereafter, the UE starts receiving a frame for the downlink dedicated channel signal from the Node B based on the second control value, and starts transmitting the uplink dedicated channel signal frame to the Node B based on the first control value, after receiving the downlink dedicated channel signal frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

An embodiment of the present invention discloses a method for synchronizing UL DPCHs transmitted from UEs that perform scrambling using the same scrambling code, in a CDMA communication system employing the USTS (Uplink Synchronous Transmission Scheme). A process necessary for initial synchronization of the UL DPCH can be divided into two processes: one is a process for synchronization in a slot unit or 256*m-chip unit (where m is an integer, for example m=1), and another is a scrambling code synchronization process.

First, the slot or 256*m-chip unit synchronization process will be described. For example, if m=1, the synchronization is performed in a unit of 256 chips.

Figure 1:
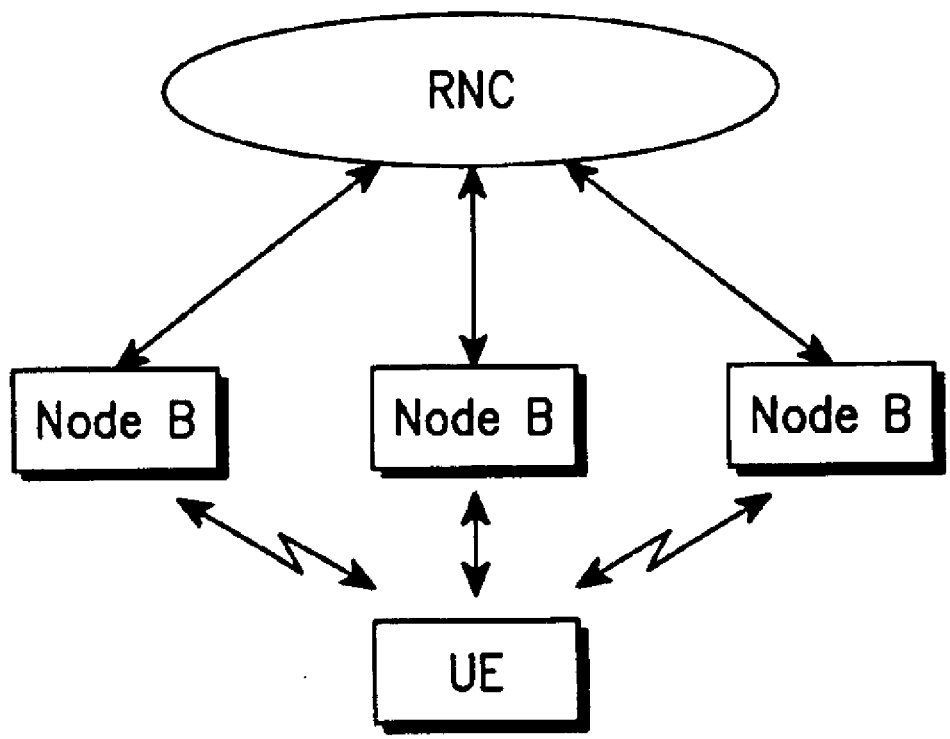
FIG. 1 is a diagram illustrating architecture of a W-CDMA communication system.
Figure 2:
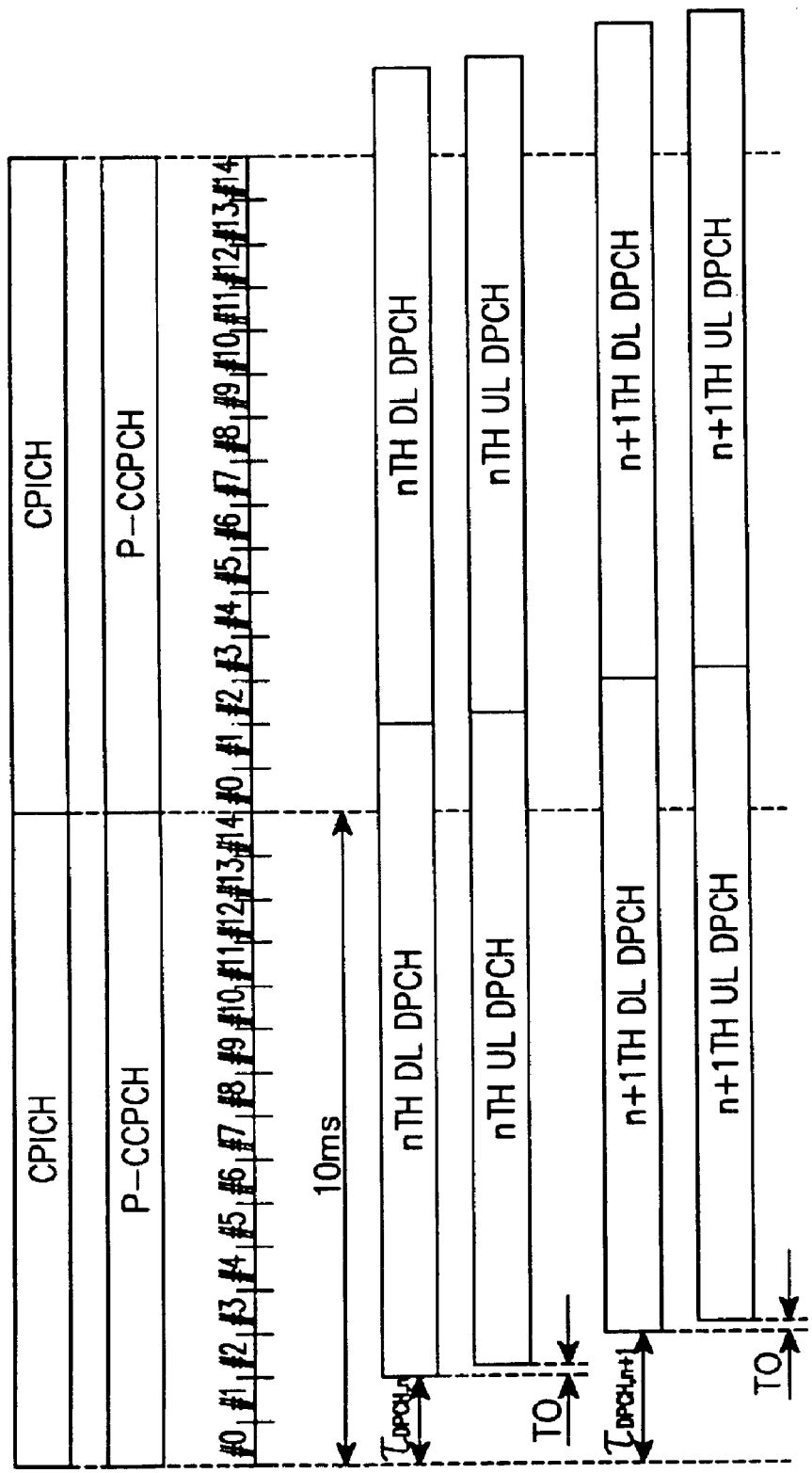
FIG. 2 is a diagram illustrating the timing relationship between a DL DPCH and an UL DPCH in the W-CDMA communication system.
Figure 3:
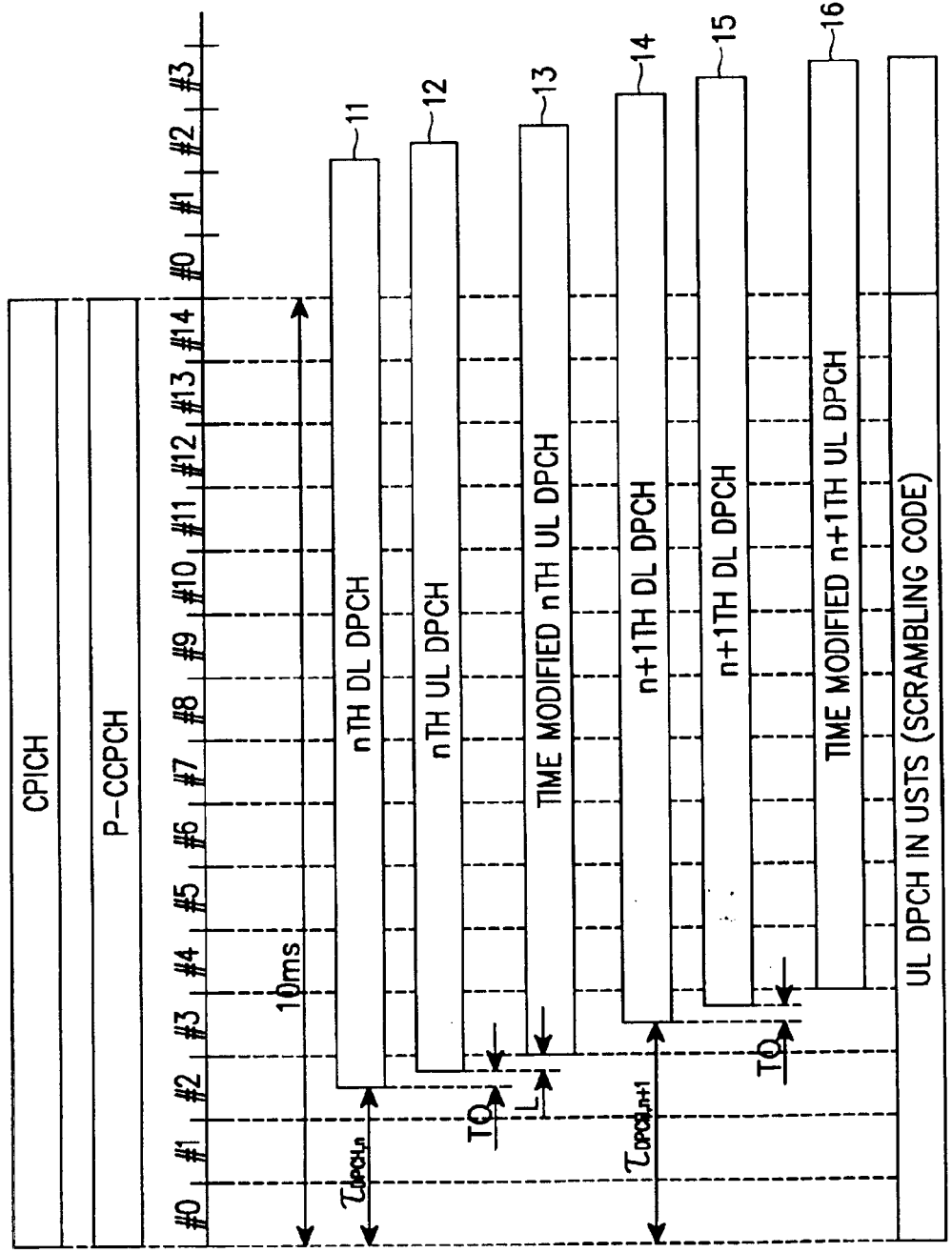
FIG. 3 is a diagram illustrating the timing relationship when synchronization is performed by a USTS according to an embodiment of the present invention.

FIG. 3 illustrates the timing relationship when synchronization is performed in a USTS mode according to an embodiment of the present invention. It is assumed that there exists no propagation delay between the Node B and the UEs, i.e., that the UE receives the DL DPCH transmitted by the Node B with no propagation delay and the Node B also receives the UP DPCH transmitted by the UE with no propagation delay. When there exists a propagation delay between the Node B and the UEs, a round trip time (RTT) must be considered. However, since the system will operate in the same manner even though there exists the propagation delay, the round trip time will be assumed to be '0'. In addition, the timing diagram of FIG. 3 can also be construed as the timing of the UEs. That is, it can be construed that the timing of the CPICH and the DL DPCH indicates a time when the UE receives the signal, and the timing of the UL DPCH and the 'Time modified UL DPCH' indicates a time when the UE transmits the signal.

Referring to FIG. 3, reference numeral 11 indicates a transmission point of the DL DPCH transmitted to an $n^{th}$ UE out of the UEs sharing a given scrambling code. The DL DPCH 11 transmitted to the $n^{th}$ UE is transmitted after delay of a time offset $\tau_{DPCH,n}$ from the transmission point of the CPICH or the P-CCPCH. The respective DPCHs have a different transmission point. Reference numeral 12 indicates a transmission point of the UL DPCH transmitted from the $n^{th}$ UE. The UE transmits the UL DPCH at time $T_o$ after receiving the DL DPCH. Therefore, the UEs have the different UL DPCH transmission point. The USTS must synchronize the UL DPCHs with one another. Therefore, when it is desired to perform communication using the USTS, a process for synchronizing the UL DPCHs is required. The embodiment of the present invention discloses a method for synchronizing the UL DPCHs transmitted from the UEs sharing the same scrambling code in the USTS mode. A method for initializing the USTS mode will be described with reference to a case of m=10.

(Step 1) Measurement of Propagation Delay (PD) from RACH Signal

Upon receipt of an RACH signal transmitted from the UE, the Node B measures a propagation delay (PD) value of the RACH signal. The measured PD value is used when the Node B assigns the DPCH.

(Step 2) Calculation of K=($\tau_{DPCH,n}$+$T_o$+2*PD) mod 2560

The Node B calculates a remainder K obtained by diving by 2560 the sum of a time offset $\tau_{DPCH,n}$ of a given DPCH, a constant $T_o$, and a value 2*PD measured in (Step 1). Here, the time offset $\tau_{DPCH,n}$ indicates a delay time (or time difference) between the P-CCPCH and the DL DPCH, and the constant $T_o$ indicates a delay time between the DL DPCH and the UL DPCH transmitted to and from the UE. Further, the PD value indicates a propagation delay value, wherein '2560' indicates the number of chips constituting one slot.

(Step 3) Transmission of L=2560−K to UE

The Node B calculates a value L using the value K, and then, transmits the calculated value L to the UE. Upon receipt of the value L, the UE transmits the UL DPCH, after the delay of the time $T_o$ plus the time L from a reception point of the DL DPCH.

Step 3 above is a process for synchronizing the UEs in a slot (=2560 chip) unit. Although the synchronization is performed in a unit of 2560-chip slot herein, it is also possible to perform the synchronization in a unit of a multiple of 256 chips in the light of the property of the OVSF codes. Performing synchronization in a unit of 2560-chip slot is an example of performing synchronization in a unit of 256*m chips where m=10. Here, the value 'm' can be either provided through a signaling message from an upper layer or previously determined. A process for performing synchronization in a unit of 256*m chips will be described below.

(Step 1) Measurement of Propagation Delay (PD)

Upon receipt of an RACH signal transmitted from the UE, the Node B measures the propagation delay value PD of the RACH signal. It is known that the measured PD value is used when the Node B assigns the DPCH. The PD value can be calculated in a chip unit. In this case, the PD value indicates a one-way propagation delay time between the Node B and the UE.

(Step 2) Calculation of K=($\tau_{DPCH,n}$+T$_o$+2*PD) mod 256*m

The Node B calculates a remainder K obtained by dividing by 256*m the sum of a time offset $\tau_{DPCH,n}$ of a given DPCH, a constant T$_o$, and a value 2*PD measured in (Step 1).

(Step 3) Transmission of L=256*m−K to UE

The Node B calculates a value L using the value K, and then, transmits the calculated value L to the UE. Upon receipt of the value L, the UE transmits the UL DPCH, after the delay of the time T$_o$ plus the time L from a reception point of the DL DPCH.

In (Step 2), the time offset $\tau_{DPCH,n}$ is previously defined as 256*mK chips, and the value T$_o$ is previously defined as 256*4 chips. Therefore, for m=1, the value K is equivalent to a remainder determined by dividing 2*PD by 256 (i.e., 2*PD mod 256). In (Step 3), the Node B can transmit the value K instead of the value L to the UE. In this case, the UE can calculate the value L from the value K, or use the intact value K.

If the K value or the L value is less than a reference value (e.g., 128), the Node B transmits K (or L) so that the UE transmits the signal as early as the value K (or 256−L). However, if the K value or the L value is larger than the reference value, the Node B transmits +K (or +L) so that the UE transmits the signal as late as the value L. Upon receipt of the value K or the value L transmitted from the Node B, the UE may also transmit the UL DPCH, at time T$_o$−K after the reception point of the DL DPCH using the received value K, rather than transmitting the UL DPCH after the delay of the time T$_o$ plus the time L from the receipt time of the DL DPCH. Therefore, upon receipt of the value L or the value K, the UE transmits the UL DPCH after calculating the value K or the value L in the above-stated method.

In the method for transmitting the K value or the L value, the Node B may set a time alignment value of the UE below 128 chips for m=1 in order to minimize the time alignment value. For example, if the K value is less than 128, the Node B directly transmits the K value to the UE. Upon receipt of the K value less than 128, the UE transmits the UL DPCH after a lapse of the T$_0$−K time from the reception point of the DL DPCH as stated above. If the K value is larger than or equal to 128, the Node B transmits the L (=256−K) value with a negative sign. Upon receipt of the L value, the UE transmits the UL DPCH after a lapse of the T$_o$+L time from the reception point of the DL DPCH.

The Node B may also transmit the PD value to the UE instead of transmitting the value L or the value K. In this case, upon receipt of the PD value transmitted from the Node B, the UE can use the received PD value in transmitting the UL DPCH considering the time offset $\tau_{DPCH,n}$ and the value T$_o$. For example, upon receipt of the PD value, the UE can transmit the UL DPCH using a value T$_{off}$ which is determined by subtracting the 2*PD value from the value T$_o$ after receiving the DL DPCH. Alternatively, the UE can also transmit the UL DPCH after the further delay of a time determined by adding a common propagation delay time T$_{all}$ given in the system to the time T$_{off}$.

That is, the common propagation delay time value T$_{all}$ is shared by the UEs using the same cell or the same USTS scrambling code, and is defined such that the UL DPCHs received at the Node B from the UEs have a predetermined delay time. For example, the common propagation delay value T$_{all}$ can be defined as a maximum propagation delay value depending upon the cell radius at the respective cells. If the UE transmits the UL DPCH after a lapse of the T$_{off}$ time plus the T$_{all}$ time after receiving the DL DPCH, the Node B receives the UL DPCH after a lapse of the T$_o$ time plus the T$_{all}$ time after transmitting the DL DPCH to the UE. To this end, the Node B can transmit the common propagation delay value T$_{all}$ and the propagation delay value PD to the UE.

In addition, the Node B can also calculate an additional delay time value T$_{add}$ which will be additionally considered by the UE after the T$_o$ time considering the common propagation delay value T$_{all}$ and the propagation delay value PD, and then, transmit the calculated additional delay value T$_{add}$. The additional delay value T$_{add}$ can be calculated by $$T_{add}=T_{all}+T_{off}-T_o=T_{all}-2*PD$$

Therefore, the Node B transmits the T$_{add}$ value to the UE, and the UE transmits the UL DPCH additionally considering the T$_{add}$ value after a lapse of the T$_o$ time after receiving the DL DPCH. Therefore, the Node B can receive the UL DPCH after a lapse of the T$_0$ time plus the common propagation time T$_{all}$ after transmitting the DL DPCH to the UE. In addition, the UE can calculate the K value and the L value using the propagation delay value PD transmitted by the Node B, and transmit the UL DPCH after a lapse of T$_{off1}$(=T$_o$−L) time from the DL DPCH frame start point.

When using the T$_{add}$ value, the Node B can easily receive the UL DPCH if it previously knows the T$_{all}$ value. The Tail value can be given according to the cells or the USTS groups. The T$_{add}$ value can be determined by the RNC and is transmitted from the RNC to the Node B so that the Node B can easily receive the UL DPCH.

Next, the scrambling code synchronization process will be described.

Reference numeral 13 of FIG. 3 indicates a transmission point of the UL DPCH of the n$^{th}$ UE, which is subjected to slot or 256-chip synchronization. Therefore, when received at the Node B, the n$^{th}$ UE's UL DPCH is slot-synchronized. A sync error caused by mobility of the UE during a time between transmission of the RACH signal and transmission of the UL DPCH can be modified by performing the tracking process.

Reference numerals 14, 15 and 16 of FIG. 3 indicate a DPCH transmission point of an (n+1)$^{th}$ UE having a different time offset $\tau_{DPCH,n+1}$. The (n+1)$^{th}$ UE also undergoes the slot synchronization in the same method as used by the n$^{th}$ UE.

In this method, it is possible to acquire the slot synchronization among the UEs sharing one scrambling code. Even though the slot synchronization is acquired, the frame synchronization may not be acquired according to the time offset $\tau_{DPCH,n+1}$. In order for the UEs in a USTS group to use one scrambling code, it is necessary to time-align (or synchronize) the scrambling codes used by the UEs.

Reference numeral 17 of FIG. 3 indicates a method for aligning the scrambling codes from the UEs. In order for the UEs belonging to the USTS group using one scrambling code to acquire synchronization of the scrambling codes at the time when the Node B receives the UL DPCH, a separate scrambling code synchronization operation is required. Here, "synchronization of the scrambling codes" means that the scrambling codes start at the same time. That is, synchronization of the scrambling codes means that a start point C(0) of the scrambling codes C(i) where i=0,1, . . . ,38399, is time aligned.

It is not possible to acquire synchronization of the scrambling codes only by the process of performing synchronization in a unit of slot or in a unit of 256*m chips. Therefore, for the synchronization of the scrambling codes, it is necessary to align the start points of the scrambling codes to a common reference time. FIG. 3 shows that for the synchronization of the scrambling codes, the frame start point of the CPICH or the P-CCPCH is used as the common reference time as represented by reference numeral 17.

When the frame start point of the CPICH or the P-CCPCH is used as the common reference time, the UEs in the USTS group start creating the scrambling codes in sync with the frame start point of the CPICH or the P-CCPCH. For example, the $n^{th}$ UE starts frame synchronization of the UL DPCH 13 at a $4^{th}$ slot Slot#3. In this case, although the $n^{th}$ UE's frame start point is the $4^{th}$ slot (i.e., Slot#3), a start point of the scrambling code must be aligned to the first slot (Slot#0). That is, the start point of the scrambling code is not aligned with the frame start point of the UL DPCH. In the conventional method, the start point of the scrambling code is time-aligned with the frame start point of the UL DPCH. However, the embodiment of the present invention time-aligns the start point of the USTS scrambling code by separating the frame start point of the UL DPCH and the start point of the scrambling code.

The scrambling code synchronization process will be described below with reference to the $n^{th}$ UE.

According to the prior art, since the frame start point of the UL DPCH is time-aligned with the start point of the scrambling code, the $n^{th}$ UE uses the scrambling code which starts from C(0) at the $4^{th}$ slot (Slot#3). In the embodiment of the present invention, however, the frame start point of the P-CCPCH is used as the common reference time. Therefore, in order to use the scrambling code starting from C(0) at the $1^{st}$ slot (Slot#0), the $n^{th}$ UE must know a scrambling code generated at the frame start point of the UL DPCH which starts at the $4^{th}$ slot (Slot#3). Since the scrambling code is comprised of 2560 chips per slot, the UE whose UL DPCH frame starts from the $4^{th}$ slot (Slot#3) uses a scrambling code starting from C(3*2560), and uses a scrambling code restarting from C(0) at the (Slot#0). That is, the UE changes the scrambling code C(i) (where i=0,1, . . . ,38399) to D(i)=C((i+3*2560) modulo 38400) (where i=0,1, . . . ,38399), and starts the scrambling code D(i) from D(0) beginning at the frame start point of the $4^{th}$ slot (Slot#3).

Therefore, each UE calculates the frame start point of the UL DPCH based on the time offset $\tau_{DPCH,n}$ and the value L, changes the scrambling code to D(i)=C((i+m*2560) modulo 38400) (where i=0,1, . . . ,38399) for the frame start point corresponding to Slot#m, and uses the scrambling code starting from D(0) beginning at the frame start point.

In the foregoing description, the common reference time is defined as the frame start point of the P-CCPCH. However, the common reference time can also be determined by the Node B and broadcast to the UE employing the USTS.

As another example of determining the common reference time, the frame start point of the UL DPCH from the first assigned UE out of the UEs in the USTS using a given scrambling code is defined as the common reference time. Referring to FIG. 3, only the $n^{th}$ UE and the $(n+1)^{th}$ UE use the given scrambling code. When the $n^{th}$ UE is first assigned the channel, the UE changes the scrambling code to D(i)= C((i+m*2560) modulo 38400) (where i=0,1, . . . ,38399) and uses a scrambling code starting from D(0) beginning at the frame start point as the common reference time. Further, the frame start point of the $(n+1)^{th}$ UE, i.e., the $4^{th}$ slot (Slot#3) can also be defined as the scrambling code start point. Therefore, the Node B transmits to the $(n+1)^{th}$ UE this information indicating that Slot#3 is the common reference time, so that the $(n+1)^{th}$ UE acquires synchronization.

This embodiment discloses the scrambling synchronization method based on the slot synchronization. When synchronization is performed in a unit of 256*m chips, the scrambling synchronization method is as follows. In the 256*m-chip unit synchronization process, the UE determines the transmission point of the UL DPCH using the value L, the value K or the PD value. Since the UE and the Node B share the time offset value $\tau_{DPCH,n}$ and the value $T_o$, they can know how the synchronization was performed in the 256*m-chip unit, depending on the value L, the value K and the PD value. Therefore, it is possible to search the scrambling start point based on the PD value or the value L.

For example, if (1) $\tau_{DPCH,n}$=256*25 chips, (2) $T_o$=256*4 chips, (3) PD=1000 chips and (4) m=1, then the value L is calculated by L=256−[($\tau_{DPCH,n}$+$T_o$+PD) mod 256]=232.

The UE uses the value L calculated for the 256-chip unit synchronization. That is, the UE starts transmitting the UL DPCH frame after the delay of the $T_o$+L value from the frame start point of the received DL DPCH. Further, for the scrambling code synchronization, the UE determines a scrambling code offset using the frame start point of the received P-CCPCH and also using the PD value received from the Node B. The scrambling code offset refers to a time difference between the start point of the scrambling code designated as the reference time and the start point of the scrambling code of the current UE. That is, the UE changes the scrambling code to D(i)=C((i+offset$_{sc}$) modulo 38400) (where i=0,1, . . . ,38399), and uses the scrambling code starting from D(0) beginning at the frame start point. The scrambling code offset value offset$_{sc}$ is calculated by $$\text{offset}_{sc}=\tau_{DPCH,n}+T_o+2*PD+L \tag{1}$$

As stated above, the L value in Equation (1) has the following values.

(Ex 1) $L=256*m-((\tau_{DPCH,n}+T_o+2*PD) \mod 256*m)$

Therefore, it can be noted that the offset$_{sc}$ value is a multiple of 256*m chips. The L value in Equation (1) can also be calculated by the following formula, and this is another example of the 256*m-chip unit synchronization.

(Ex 2) $L=-((\tau_{DPCH,n}+T_o+2*PD) \mod 256*m)$

The L value can also be defined as a general value, as follows.

(Ex 3) $L=K-((\tau_{DPCH,n}+T_o+2*PD) \mod 256*m)$

In the above formulas, the K value is a multiple of 256*m and can be determined by the Node B. In particular, when the K value is not a multiple of 256*m, new synchronization other than the 256*m-chip unit synchronization may be required. (Ex 1) corresponds to the case where the K value is 256*m chips, while (Ex 2) corresponds to the case where the K value is 0. Further, in the above formulas, every value is measured and calculated in a chip unit. However, when the values are measured and calculated in a unit of (1/k) chips, the propagation delay value PD can be precisely measured in a unit of up to (1/k) chips. In this case, 'mod 256*m' in the above formulas must be exchanged with 'mod 256*m*k'.

The offset value can be either calculated by the UE or directly provided to the UE from the Node B. In the case where the Node B directly provides the offset value to the UE, either the Node B may directly transmit the offset value or the UE may calculate the offset value using the information received from the Node B in the slot or 256*m-chip unit synchronization process. When directly transmitting the offset value, the Node B may transmit only the PD value and the L value, since the UE already knows $\tau_{DPCH,n}$ and $T_o$ depending on other information. Alternatively, the Node B defines the 2*PD+L as offset0 and transmits the defined value offset0, so that the UE can calculate the scrambling code offset value offset$_{sc}$ depending upon the received value offset0. If the information transmitted by the Node B in the slot or 256*m-chip unit synchronization process is the L value or information based on which the L value can be calculated, the Node B may additionally transmit only the PD value.

For example, in the 256*m-chip unit synchronization process, the offset value offset$_{sc}$ is calculated depending on the received $T_{add}$ value in accordance with the following formula.

offset$_{sc}$=$\tau_{DPCH,n}$+$T_o$+2*PD+$T_{add}$

That is, $T_{add}$ in the above formula serves as L in Equation (1). It is noted from the above formula that the UE needs the PD value in order to calculate offset$_{sc}$. In conclusion, for the scrambling code synchronization, the Node B either directly transmits the offset$_{sc}$ to the UE or transmits the PD value to the UE through the slot or 256*m-chip unit synchronization process.

Since $T_{add}$=$T_{all}$-2*PD, 2*PD+$T_{add}$ in the above formula can be replaced with $T_{all}$. Thus, offset$_{sc}$=$\tau_{DPCH,n}$+$T_o$+$T_{all}$. Therefore, the RNC can transmit the $T_{all}$ value to the UE instead of transmitting the PD value. If the $T_{all}$ value is defined as one value in each cell, the $T_{all}$ value is previously transmitted to the UE through broadcasting information, i.e., cell information, so that the UE can previously know this value. In this case, it is also possible to enable the UE to use the information received through the broadcasting information, rather than directly transmitting the $T_{all}$ value at the beginning of the USTS service.

A method for using the $T_{add}$ value will be described below with reference to the embodiments of the present invention.

(Step 1): The Node B measures the PD value using the RACH data received from the UE and transmits the measured value to the RNC. Herein, the RNC receiving the information from the UE will be referred to as a "Serving RNC (SRNC)." Further, the UE can send a USTS service request to the SRNC.

(Step 2): Upon receipt of the USTS service request from the UE, the SRNC determines the $T_{add}$ value depending upon the UE's PD value received from the Node B. In accordance with the present invention, the $T_{add}$ value can be obtained using the $T_{all}$ value. The $T_{all}$ value may have a different value according to the cell or the USTS group, and this value can be determined by the RNC which controls the corresponding Node B. Herein, the RNC controlling the Node B will be referred to as a "Controlling RNC (CRNC)." When the SRNC is not identical to the CRNC, the RNC corresponding to the CRNC will be referred to as a "Drift RNC (DRNC)" for the corresponding UE. Therefore, if the SRNC is not identical to the CRNC, the SRNC must inquire of the DRNC about the $T_{all}$ value, and the DRNC transmits the $T_{all}$ value to the SRNC. A message used at this moment may be a Radio Link Setup Response message, a Radio Link Addition Response message, or a Radio Link Reconfiguration Prepare message, all of which are RNSAP (Radio Network Subsystem Application Part) messages.

Therefore, the $T_{add}$ value is determined differently when the SRNC is identical to the CRNC and when they are not identical to each other.

(Case 1. 1) SRNC Being Identical to CRNC

The SRNC determines the $T_{add}$ value using the PD value received from the Node B and the internally determined $T_{all}$ value. The SRNC transmits information necessary for the USTS service, including the $T_{all}$ value, to the Node B. An NBAP (Node B Application Part) message used at this moment may be a Radio Link Setup Request message or a Radio Link Reconfiguration Prepare message.

In (Case 1.1), the SRNC provides the DRNC with information about whether the UE supports the USTS service. An RNSAP message used at this moment may be a Radio Link Setup Request message or a Radio Link Reconfiguration Prepare message. Upon receipt of the message, the DRNC transmits the $T_{all}$ value to the SRNC using a Response message. An RNSAP message used at this moment may be a Radio Link Setup Response message or a Radio Link Reconfiguration Ready message. At this point, the DRNC can transmit the $T_{all}$ value to the Node B so that the Node B prepares to receive the UL DPCH. The DRNC also transmits the USTS-related information to the Node B. The USTS-related information may be a Radio Link Setup Request message and a Radio Link Reconfiguration Prepare message, both of which are the NBAP messages.

(Case 1.2): SRNC Not Being Identical to CRNC

The SRNC must request the DRNC to provide the $T_{all}$ value. Otherwise, the SRNC can transmit the PD value to the DRNC to receive the $T_{add}$ value from the DRNC.

In (Case 1.2), the SRNC transmits the PD value to the SRNC together with information about whether it provides the USTS service. An RNSAP message used at this moment may be a Radio Link Setup Request message or a Radio Link Reconfiguration Prepare message. Upon receipt of the message, the DRNC determines the $T_{add}$ value using the $T_{all}$ value, and transmits the determined $T_{add}$ value to the SRNC. An RNSAP message used at this moment may be a Radio Link Setup Response message or a Radio Link Reconfiguration Ready message. At this point, the DRNC transmits the $T_{all}$ value to the Node B so that the Node B makes ready to receive the UL DPCH. The DRNC also transmits the USTS-related information to the Node B. The information transmitted at this moment may be a Radio Link Setup Request message and a Radio Link Reconfiguration Prepare message, both of which are NBAP messages.

(Step 3): The SRNC transmits the determined $T_{add}$ value or the $T_{add}$ value received from the DRNC to the UE. The transmitted $T_{add}$ value is used by the UE in the slot or 256*m-chip unit synchronization operation. The SRNC transmits the PD value or the defined offset$_{sc}$ value to the UE, together with the T$_{add}$ value. This value is used for the scrambling code synchronization by the UE. The SRNC may transmit the T$_{all}$ value instead of the PD value. Otherwise, when the T$_{all}$ value is transmitted to the UE through the broadcasting information, the SRNC can omit transmitting the T$_{all}$ value.

In (Step 2), upon receipt of the USTS-related information such as the T$_{all}$ value, the Node B starts transmitting the DL DPCH and receiving the UL DPCH. In (Step 3), upon receipt of the USTS-related information such as the T$_{add}$ value and the PD (or offset$_{sc}$) value, the UE starts receiving the DL DPCH and transmitting the UL DPCH from and to the Node B.

By using the scrambling code synchronization method, the start points of the scrambling codes from the UEs supporting the USTS service may arrive at the same point at the Node B, because the P-CCPCH is set as the common reference time.

It is also possible to align the scrambling codes in sync with the first assigned UE. In this case, it is further necessary to transmit information through an upper layer signal for scrambling code synchronization. The RNC can directly transmit the information to the UEs, for the synchronization. That is, the RNC can transmit the L value for the 256*m-chip unit synchronization and transmit synchronization information of a reference UE for the scrambling code synchronization. For example, the RNC may also directly transmit the offset$_{sc}$ value.

A method for aligning the scrambling codes in sync with the first assigned UE will be described below.

The Node B sets an offset value for the UE, which is first assigned a USTS scrambling code, to '0'. That is, the first UE aligns the frame start point with the scrambling code start point instead of synchronizing a specific scrambling code for the UL DPCH. Meanwhile, when assigning the USTS channel to the scrambling code used by a plurality of UEs, a newly accessing UE receives an offset value for the scrambling code synchronization from the Node B. The received offset value can be calculated on the basis of the first assigned UE. In this case, since the respective UEs are primarily subjected to synchronization for the channelization code through the slot or 256*m-chip unit synchronization process, they can calculate the offset value in a unit of 256*m chips. Here, the channelization code is an OVSF code used for separating the channels in the CDMA system.

The above-stated synchronization process will be described with reference to FIG. 3, in which it is assumed that the n$^{th}$ UE is a UE which is first assigned the USTS scrambling code, and that m=10 in the slot or 256*m-chip unit synchronization process in the initial synchronization process. Referring to FIG. 3, the n$^{th}$ UE aligns the frame start point and the scrambling code start point to Slot#2 after acquiring slot synchronization. That is, the offset value is '0'. Similarly, the (n+1)$^{th}$ UE aligns the frame start point to Slot#3 after slot synchronization. In order to synchronize the scrambling code with the n$^{th}$ UE, the scrambling code is synchronized with an offset of one slot or 256* 10 chips. That is, the scrambling code start point is aligned to Slot#2. Thereafter, an offset value for the (n+1)$^{th}$ UE becomes 256*10 chips.

Figure 4:
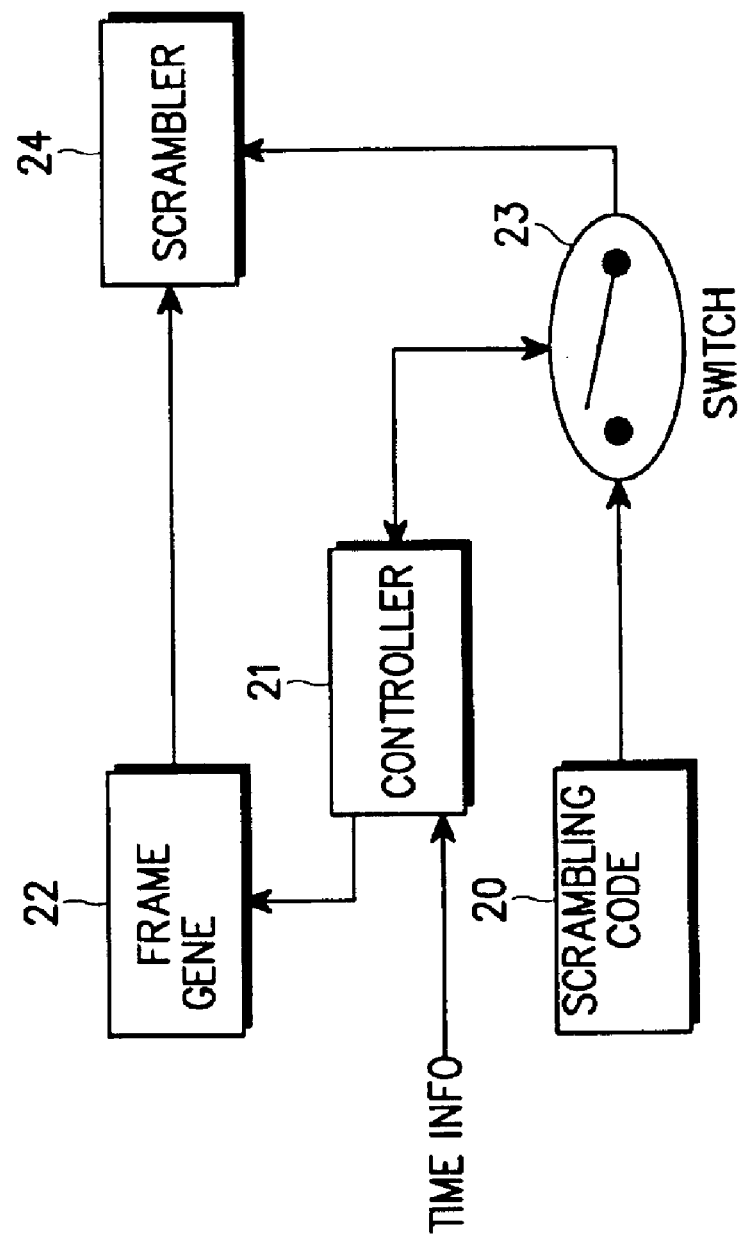
FIG. 4 is a block diagram illustrating a structure of a scrambling code synchronization apparatus for a UE according to an embodiment of the present invention.

FIG. 4 illustrates a structure of a scrambling code synchronization apparatus for the UE according to an embodiment of the present invention. Referring to FIG. 4, a scrambling code generator 20 creates a scrambling code in sync with a given common reference time. That is, when the frame start time of the P-CCPCH is defined as the common reference time, the scrambling code generator 20 creates a scrambling code starting from C(0) beginning at the first slot Slot#0 of the P-CCPCH. Alternatively, when the frame start point of the first UE is set as the common reference time, the scrambling code generator 20 creates a scrambling code starting from C(0) beginning at the slot which becomes the frame start point of the first UE. Here, the frame start point of the P-CCPCH received by the UE is set on condition that the propagation delay value PD is 0. However, when the propagation delay value PD is not 0 in an actual situation, the UE creates the scrambling code starting from C(0) beginning at the frame start point of the P-CCPCH, which is shifted ahead by 2*PD chips.

A controller 21 receives time information about the frame start point from the upper layer. The frame start point is calculated based on the time offset value $\tau_{DPCH,n}$ and the PD value. For example, in FIG. 3, the frame start point of the UE transmitting the n$^{th}$ DPCH becomes Slot#3, and the frame start point of the UE transmitting the (n+1)$^{th}$ DPCH becomes Slot#4. The controller 21 transmits the frame start point information to a frame generator 22 and a switch 23 based on the time information, so as to control the UE to start transmitting the UL DPCH. Upon receipt of the frame start point information from the controller 21, the frame generator 22 starts creating the frame at a given time and transmits the created frame to a scrambler 24. Upon receipt of the frame start point information from the controller 21, the switch 23 transmits the scrambling code created by the scrambling code generator 20 to the scrambler 24. The scrambler 24 spreads the frame received from the frame generator 22 using the scrambling code received from the scrambling code generator 20. As a result, the DPCH frame is scrambled with the scrambling code generated beginning at a time point of 2*PD+$\tau_{DPCH,n}$+T$_o$+T$_{add}$. That is, the DPCH frame is scrambled with the scrambling code starting from C(2*PD+$\tau_{DPCH,n}$+T$_o$+T$_{add}$).

In operation of the scrambling code synchronization apparatus, the controller 21 drives the frame generator 22 at the frame start point in order to create the data frame to be transmitted over the DPCH. Further, the controller 21 turns ON the switch 23 at the frame start point so as to provide the scrambling code created by the scrambling code generator 20 to the scrambler 24. The scrambling code generator 20 can create the scrambling code in sync with the frame start point of the CPICH or the P-CCPCH. In this case, since the scrambling code is provided to the scrambler 24 beginning at the frame start point of the DPCH, the scrambling code created at the frame start point of the DPCH may not be identical to C(0). That is, when the frame start point of the DPCH starts at the 3$^{rd}$ slot, the DPCH data frame is spread with the scrambling code created at the 3$^{rd}$ slot. In addition, if the scrambling code generator 20 generates the scrambling code in sync with the frame start point of the first UE in the USTS group, to which the DPCH is assigned, instead of creating the scrambling code at the frame start point of the CPICH or the P-CCPCH, the controller 21 controls a time point for creating the scrambling code. The succeeding operation is identical to that described above.

By using the scrambling code synchronization apparatus, it is possible to transmit the frame in sync with a given time offset by using the scrambling code time-aligned with the common reference time during transmission of UL DPCH of the USTS.

The scrambling code synchronization method according to the present invention acquires slot synchronization of the UEs in the USTS group and aligns the start points of the scrambling codes. Therefore, it is possible to reduce interference thanks to the time alignment of the scrambling codes and identify information from the UEs through the channelization code (e.g., OVSF code) by slot synchronization.

The handover type of the UE employing the USTS in the mobile communication system supporting the USTS service can be divided into one case where a new cell, i.e., a target handover cell, provides a USTS handover and another case where the new cell does not provide the USTS handover.

First, an operation of the system will be described with reference to the case where the new cell provides the USTS handover. When the new cell, a target cell to which the UE is to be handed over, provides the USTS handover, it is possible to perform a handover to the new cell while maintaining the USTS service in the current cell. For the communication service on the UE in the new cell, it is possible to use either the USTS service or a normal communication service, i.e., a data service in which a normal DPCH not supporting the USTS service is assigned. In order to set up a new radio link in the new cell while maintaining the USTS service in the current cell, the SRNC transmits the following information to the Node B and the RNC corresponding to the new cell, as shown in FIGS. 5 to 8:

(1) UL scrambling code for the UE employing the USTS (USTS scrambling code)
(2) information on UL DPDCH and UL DPCCH channelization codes for the UE employing the USTS (USTS CH code NO)
(3) indicator indicating that the UE is employing the USTS (USTS indicator)
(4) scrambling code time offset information (USTS offset)

Figure 5:
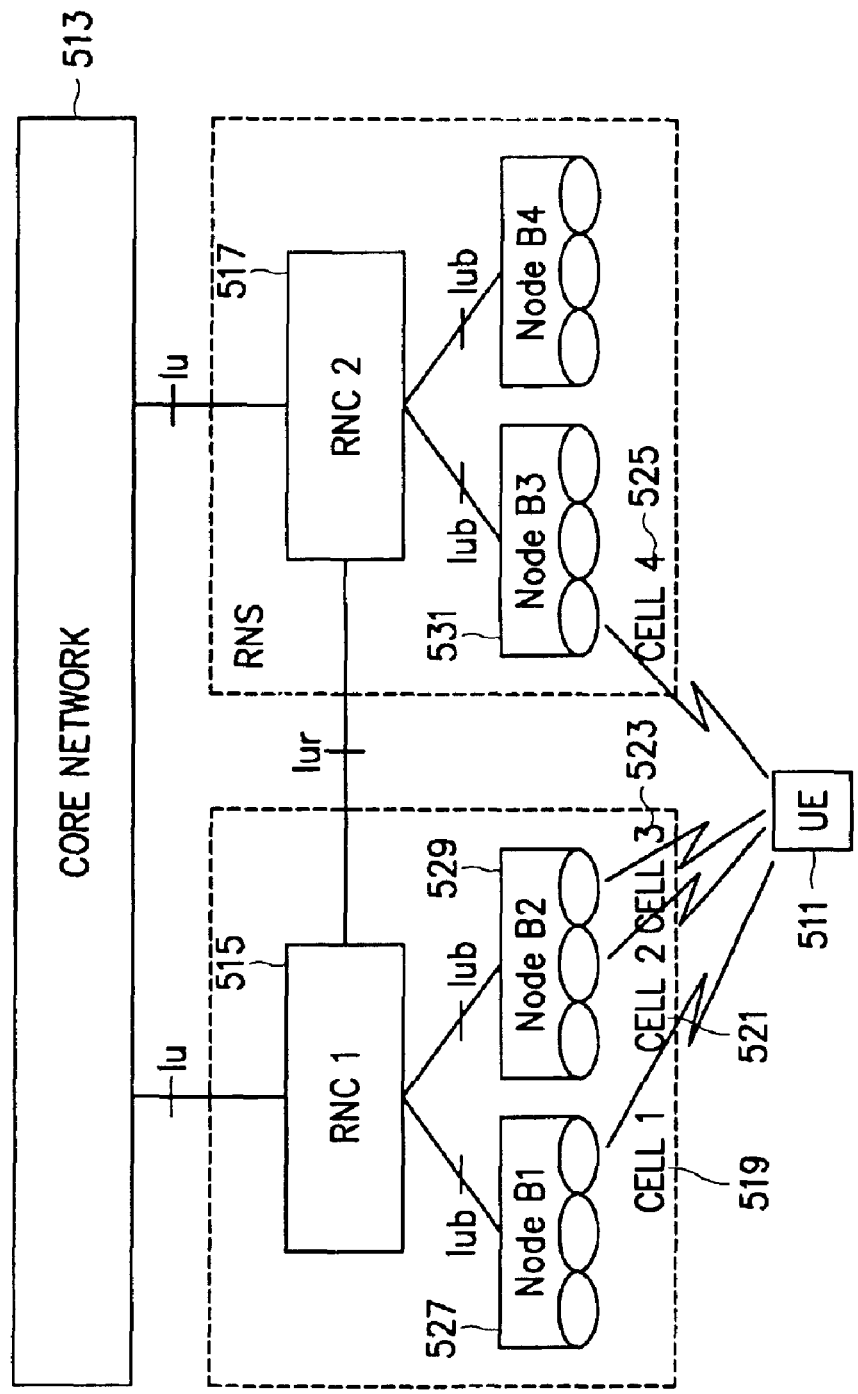
FIG. 5 is a diagram illustrating a structure of a UTRAN in a W-CDMA mobile communication system according to an embodiment of the present invention.

FIG. 5 illustrates a structure of a UTRAN in a W-CDMA mobile communication system, wherein a UE 511 is connected to the UTRAN. Referring to FIG. 5, a first RNC 515 connecting the UE 511 to a core network 513 is called a "Serving RNC (SRNC)", while a second RNC 517 assisting a connection to the SRNC 515 is called a "Drift RNC (DRNC)." FIG. 5 shows a state where the UE 511 sets up radio links to first to fourth cells 519, 521, 523 and 525. In this state, it is said that "the UE 511 exists in a handover region" or "the UE 511 is in a handover state". The first cell 519 having a radio link connected to the UE 511 exists in a first Node B 527, the second and third cells 521 and 523 exist in a second Node B 529, and the fourth cell 525 exists in a third Node B 531.

Figure 6:
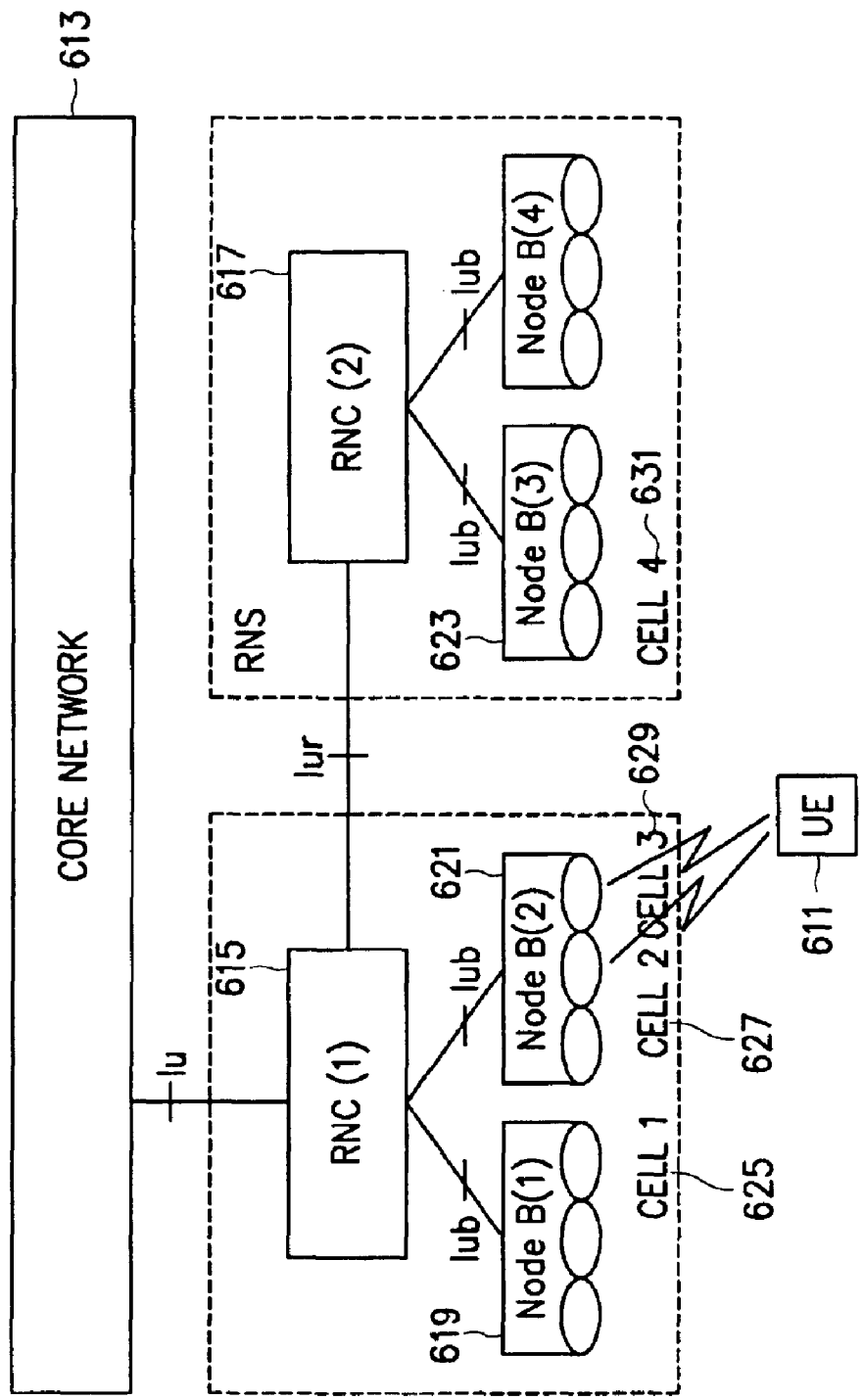
FIG. 6 is a diagram illustrating a structure of a UTRAN in a W-CDMA mobile communication system according to another embodiment of the present invention, wherein a handover of a UE is performed within the same Node B.

FIG. 6 illustrates a structure of a UTRAN in a W-CDMA mobile communication system, wherein a handover of a UE is performed within the same Node B according to another embodiment of the present invention. Referring to FIG. 6, a UE 611 performs an operation of setting up a new radio link to a third cell 629 in a second Node B 621, while maintaining a radio link connected to a second cell 627 in the same Node B 621. For the handover performed within the same Node B, the following message is required. Upon receipt of information on a basic measurement value for the handover from the UE 611, a first RNC (SRNC) 615 determines to perform a handover and then transmits an NBAP (Node B Application Part) message to the second Node B 621 through a Iub interface. The transmitted NBAP message is a Radio Link Addition Request message for setting up a new radio link.

Figure 9:
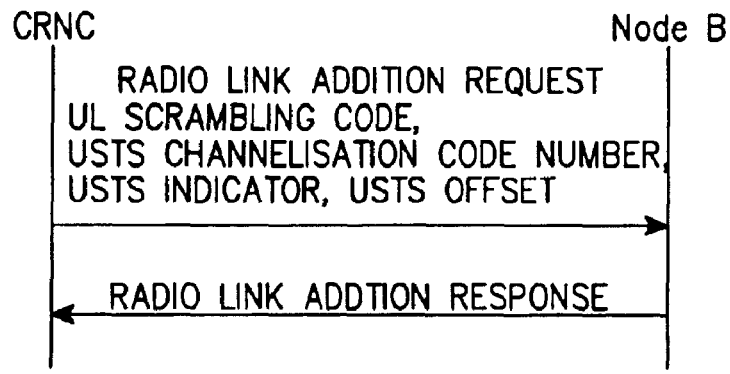
FIG. 9 is a flow diagram illustrating a process for transmitting a Radio Link Addition Request message to another cell in the same Node B during a USTS handover according to another embodiment of the present invention.

FIG. 9 illustrates a process for transmitting a Radio Link Addition Request message to another cell in the same Node B during a USTS handover according to another embodiment of the present invention. Referring to FIG. 9, the Radio Link Addition Request message includes separate parameters for the USTS handover in addition to the handover parameters. The parameters for the USTS handover are shown in Table 1 below, which will be described later. Upon receipt of the parameter information for the USTS handover, the second node B 621 sets up a new radio link to the UE 611 and exchanges data through the new radio link.

Figure 7:
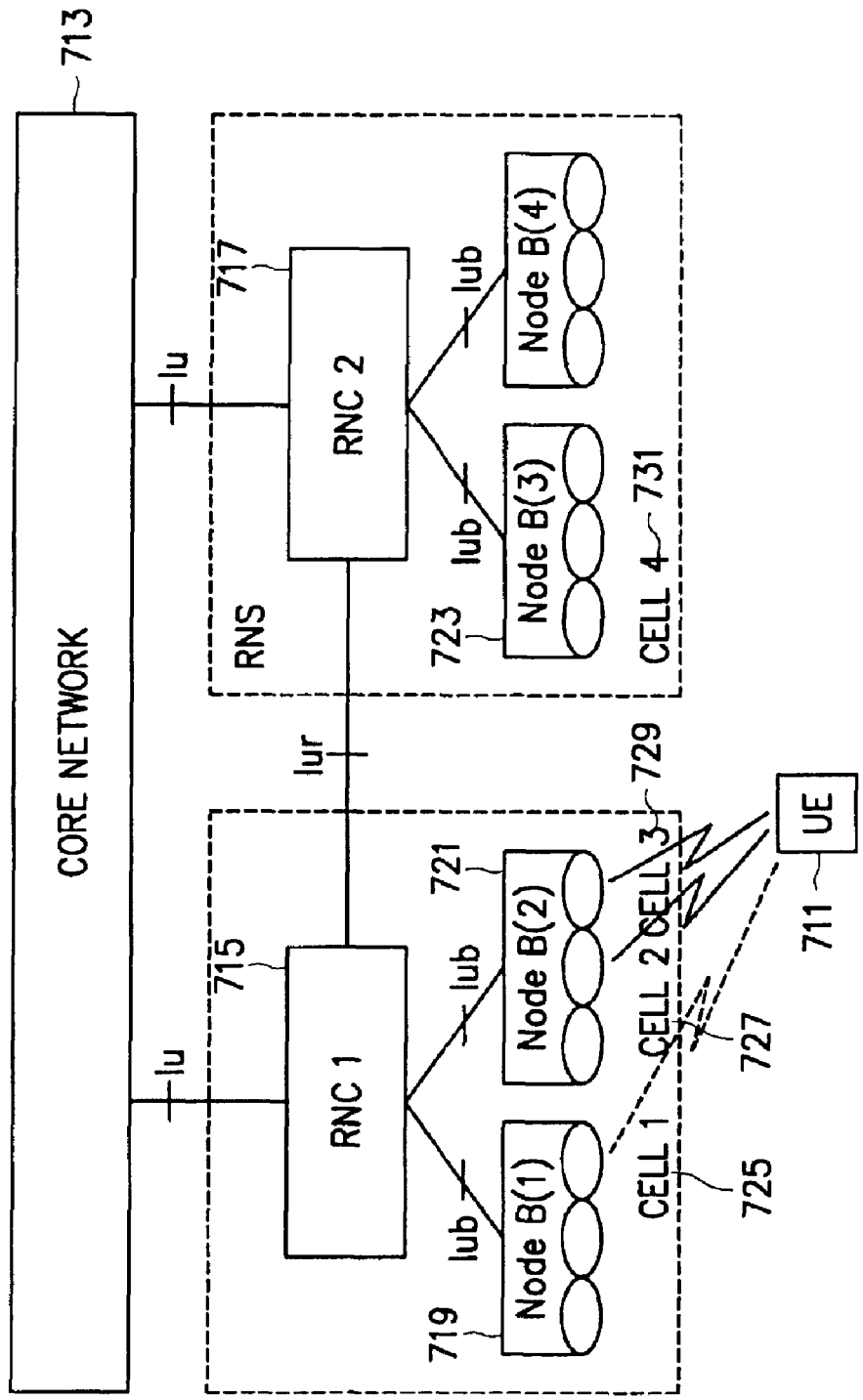
FIG. 7 is a diagram illustrating a structure of a UTRAN in a W-CDMA mobile communication system according to another embodiment of the present invention, wherein a handover of a UE is performed to another Node B within the same RNC.

FIG. 7 illustrates a structure of a UTRAN in a W-CDMA mobile communication system, wherein a handover of a UE is performed to another Node B within the same RNC according to another embodiment of the present invention. Referring to FIG. 7, a UE 711 performs an operation of setting up a new radio link to a first cell 725 in a first Node B 719, while maintaining radio links connected to second and third cells 727 and 729 in a second Node B 721. For the handover performed to another Node B within the same RNC, the following message is required. Upon receipt of information on a basic measurement value for the handover from the UE 711, a first RNC (SRNC) 715 determines to perform a handover and then transmits an NBAP message to the first Node B 719 through a Iub interface. The transmitted NBAP message is a Radio Link Setup Request message.

Figure 10:
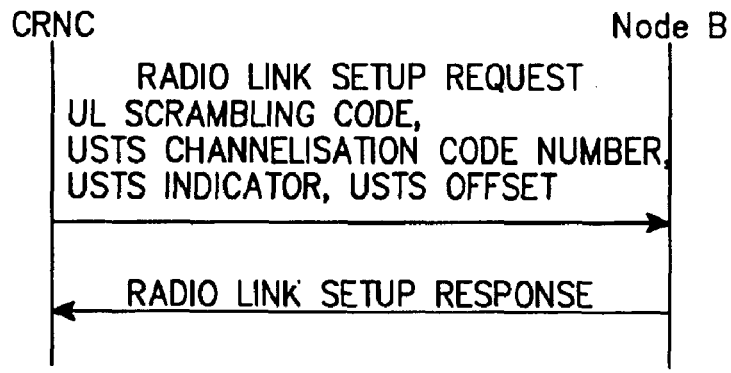
FIG. 10 is a flow diagram illustrating a process for transmitting a Radio Link Setup Request message to another Node B within the same RNC during a USTS handover according to another embodiment of the present invention.

FIG. 10 illustrates a process for transmitting a Radio Link Setup Request message to another Node B within the same RNC during a USTS handover according to another embodiment of the present invention. Referring to FIG. 10, the Radio Link Setup Request message includes separate parameters for the USTS handover in addition to the handover parameters. The parameters for the USTS handover are shown in Table 1, which will be described later. Upon receipt of the parameter information for the USTS handover, the first node B 719 sets up a new radio link to the UE 711 and exchanges data through the new radio link.

Figure 8:
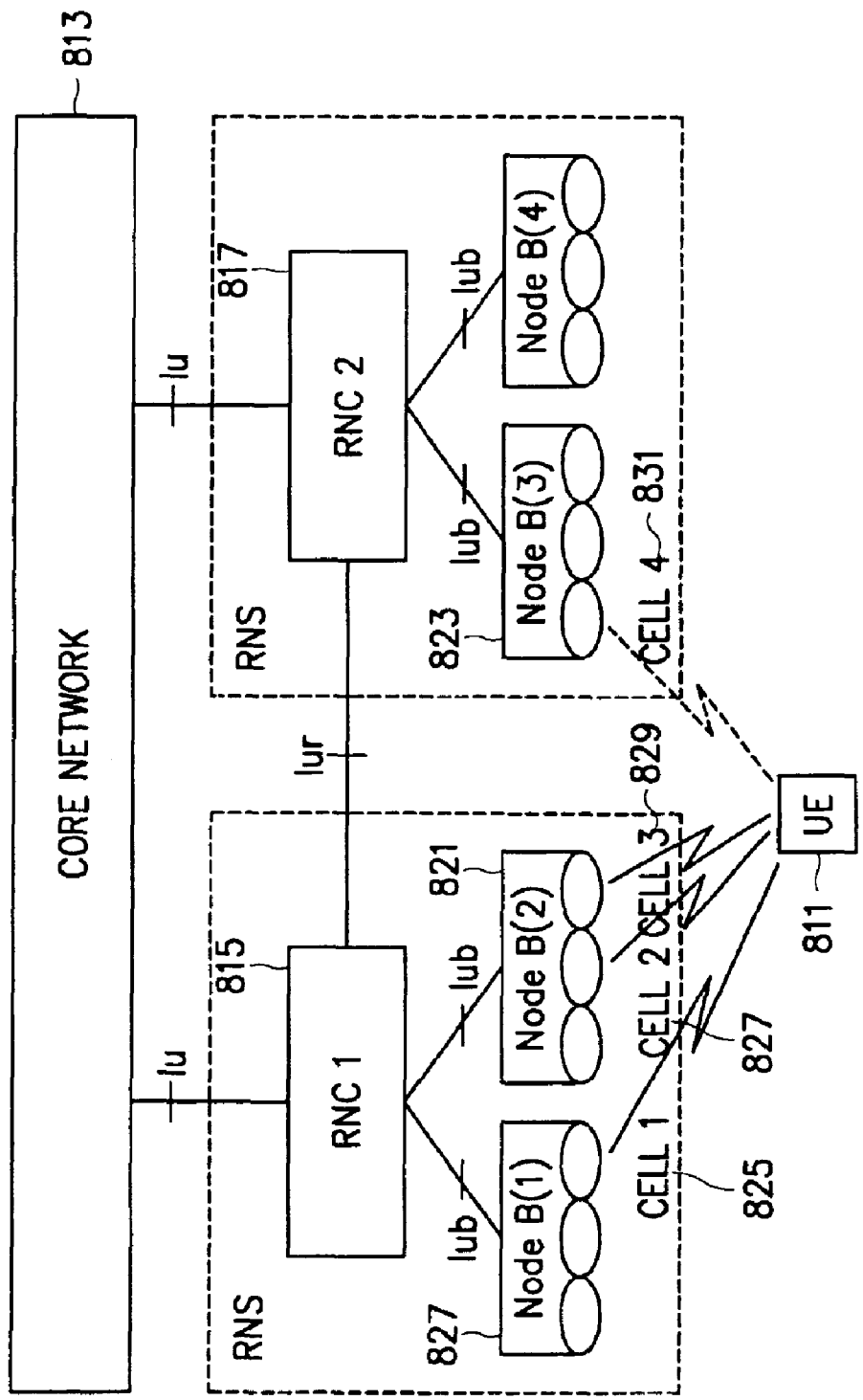
FIG. 8 is a diagram illustrating a structure of a UTRAN in a W-CDMA mobile communication system according to another embodiment of the present invention, wherein a handover of a UE is performed to a cell within another RNC.

FIG. 8 illustrates a structure of a UTRAN in a W-CDMA mobile communication system, wherein a handover of a UE is performed to a cell within another RNC according to another embodiment of the present invention. Referring to FIG. 8, a UE 811 performs an operation of setting up a new radio link to a fourth cell 831 in a second RNC 817, while maintaining radio links connected to first, second and third cells 825, 827 and 829 in a first RNC 815. For the handover performed to a cell within another RNC, the following message is required. Upon receipt of information on a basic measurement value for the handover from the UE 811, the first RNC (SRNC) 815 determines to perform a handover and then transmits an RNSAP (RNS Application Part) message to the second RNC 817 through a Iur interface. The transmitted RNSAP message is a Radio Link Setup Request message.

Figure 11:
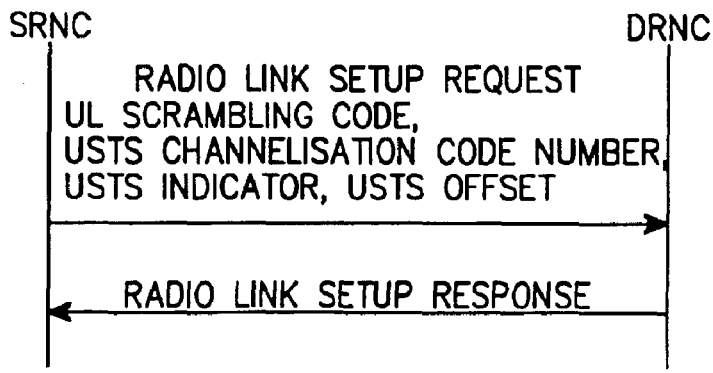
FIG. 11 is a flow diagram illustrating a process for transmitting a Radio Link Setup Request message to a cell in another RNC during a USTS handover according to another embodiment of the present invention.

FIG. 11 illustrates a process for transmitting a Radio Link Setup Request message to a cell in another RNC during a USTS handover according to another embodiment of the present invention. Referring to FIG. 11, the Radio Link Setup Request message includes separate parameters for the USTS handover in addition to the handover parameters. The parameters for the USTS handover are shown in Table 1, which will be described later. Upon receipt of the parameter information for the USTS handover, a fourth Node B 831 sets up a new radio link to the UE 811 and exchanges data through the new radio link.

In sum, when the handover is performed as shown in FIGS. 6 and 9, the RNC performs a process for creating, at a handoff request, a Radio Link Addition Request message including the USTS parameters comprised of the UL scrambling code information, the USTS indicator for indicating that the handover-requesting UE is employing the USTS, the channelization code information for the dedicated channel of the UE, and the scrambling code time offset information, and then transmitting the created Radio Link Addition Request message to the Node B, and a process for performing a handover upon receipt of a Radio Link Addition Response message from the Node B and servicing the handover channel in the USTS mode.

Further, the Node B performs a process for receiving from the RNC the Radio Link Addition Request message including the USTS parameters comprised of the UL scrambling code information, the USTS indicator for indicating that the handover-requesting UE is employing the USTS, the channelization code information for the dedicated channel of the UE, and the scrambling code time offset information, and a process for transmitting a Radio Link Addition Response message to the RNC upon receipt of the Radio Link Addition Request message, assigning a handover channel according to the received channelization code information, setting a frame start point at a scrambling code start point according to the scrambling code time offset information, and performing a handover at the set frame start point.

In addition, when the handover is performed as shown in FIGS. 7 and 10, the RNC performs a process for creating, at a handoff request, a Radio Link Setup Request message including the USTS parameters comprised of the UL scrambling code information, the USTS indicator for indicating that the handover-requesting UE is employing the USTS, the channelization code information for the dedicated channel of the UE, and the scrambling code time offset information, and then transmitting the created Radio Link Setup Request message to another Node B, and a process for performing a handover upon receipt of a Radio Link Setup Response message from another Node B and servicing the handover channel in the USTS mode.

Further, the Node B performs a process for receiving from the RNC the Radio Link Setup Request message including the USTS parameters comprised of the UL scrambling code information, the USTS indicator for indicating that the handover-requesting UE is employing the USTS, the channelization code information for the dedicated channel of the UE, and the scrambling code time offset information, and a process for transmitting a Radio Link Setup Response message to the RNC upon receipt of the Radio Link Setup Request message, assigning a handover channel according to the received channelization code information, setting a frame start point at a scrambling code start point according to the scrambling code time offset information, and performing a handover at the set frame start point.

Next, when the handover is performed as shown in FIGS. 8 and 11, a first RNC performs a process for creating, at a handoff request, a Radio Link Setup Request message including the USTS parameters comprised of the UL scrambling code information, the USTS indicator for indicating that the handover-requesting UE is employing the USTS, the channelization code information for the dedicated channel of the UE, and the scrambling code time offset information, and then transmitting the created Radio Link Setup Request message to a second RNC to which the UE is to be handed over, and a process for performing a handover upon receipt of a Radio Link Setup Response message from the second RNC and performing the handover at a set time.

Further, the Node B performs a process for receiving from the first RNC the Radio Link Setup Request message including the USTS parameters comprised of the UL scrambling code information, the USTS indicator for indicating that the handover-requesting UE is employing the USTS, the channelization code information for the dedicated channel of the UE, and the scrambling code time offset information, and a process for transmitting a Radio Link Setup Response message to the first RNC upon receipt of the Radio Link Setup Request message and transmitting the USTS parameters to the corresponding Node B, so that the Node B can assign a handover channel according to the received channelization code information, sets a frame start point at a scrambling code start point according to the scrambling code time offset information, and perform a handover at the set frame start point.

Tables 1 to 3 below show various formats of the Radio Link Setup Request message of the NBAP message, in which the USTS parameters are inserted. It is also possible to transmit the USTS parameters using the similar format even for the Radio Link Setup Request message of the RNSAP message and the Radio Link Addition Request message of the NBAP message.

Specifically, Table 1 corresponds to a case where one UE uses only one DPDCH, and Tables 2 and 3 correspond to a case where one UE can have a plurality of DPDCHs.

It is assumed in Table 2 that unlike the normal DPDCH, the UE can have a plurality of channelization codes even though SF (Spreading Factor) is not 4, and the channelization codes have the same SF. Further, it is assumed in Table 3 that unlike the normal DPDCH, the UE can have a plurality of channelization codes even though SF is not 4, and the channelization codes have the different SFs.

In Tables 1 to 3, USTS Indicator indicates that the US is employing the USTS, and USTS Channelization Code Number indicates information (USTS CH code NO) on the channelization code numbers for the UL DPDCH and the UL DPCCH of the UE employing the USTS. In addition, USTS offset indicates the scrambling code time offset information. Further, UL Scrambling Code indicates a UL scrambling code of the UE employing the USTS, and for this, the existing message information, i.e., the UL scrambling code information is used.

Table 1 shows a format of the Radio Link Setup Request (or Radio Link Addition Request) message for the USTS handover according to an embodiment of the present invention, wherein one UE uses only one DPDCH.

TABLE 1

| IE/Group Name | Presence | Range | IE type and reference | Semantics description | Criticality | Assigned Criticality |
|---|---|---|---|---|---|---|
| Message Discriminator | M | | 9.2.1.45 | | | |
| Message Type | M | | 9.2.1.46 | | YES | reject |
| CRNC Communication Context ID | M | | 9.2.1.18 | | YES | reject |
| Transaction ID | M | | 9.2.1.62 | | | |
| UL DPCH Information | | 1 | | | YES | reject |
| >UL Scrambling Code | M | | 9.2.2.59 | | | |

TABLE 1-continued

| IE/Group Name | Presence | Range | IE type and reference | Semantics description | Criticality | Assigned Criticality |
|---|---|---|---|---|---|---|
| >Min UL Channelisation Code length | M | | 9.2.2.22 | | | |
| >Max Number of UL DPDCHs | C CodeLen | | 9.2.2.21 | | | |
| >puncture limit | M | | 9.2.1.50 | for UL | | |
| >TFCS | M | | 9.2.1.58 | for UL | | |
| >UL DPCCH Slot Format | M | | 9.2.2.57 | | | |
| >UL SIR Target | M | | UL SIR 9.2.2.58 | | | |
| >Diversity mode | M | | 9.2.29 | | | |
| >D Field Length | C FB | | 9.2.2.5 | | | |
| >SSDT cell ID Length | O | | 9.2.2.45 | | | |
| >S Field Length | O | | 9.2.2.40 | | | |
| >USTS Indicator | O | | | | | |
| >USTS Channelisation Code Number | C USTS | | | | | |
| - Omitted - | | | | | | |
| RL Information | | 1 to <maxnoofRLs> | | | EACH | notify |
| >RL ID | M | | 9.2.1.53 | | | |
| >C-ID | M | | 9.2.1.9 | | | |
| >First RLS Indicator | M | | | | | |
| >Frame Offset | M | | 9.2.1.31 | | | |
| >Chip Offset | M | | 9.2.2.2 | | | |
| >Propagation Delay | O | | 9.2.2.35 | | | |
| >Diversity Control Field | C NotFirstRL | | 9.2.2.7 | | | |
| >USTS offset | | | | | | |
| - Omitted - | | | | | | |

In Table 1, USTS Channelization Code Number (USTS CH code NO) indicates a corresponding number in the OVSF code tree for a given SF in Min UL Channelization Code Length. For example, if SF=4, the USTS Channelization Code Number has one of the values 0, 1, 2 and 3. The USTS Channelization Code Number of 0 indicates the highest code node in the OVSF code tree, the USTS Channelization Code Number of 1 indicates tile second highest code node in the OVSF code tree, the USTS Channelization Code Number of 2 indicates the third highest code node in the OVSF code tree, and the USTS Channelization Code Number of 3 indicates the lowest code node in the OVSF code tree. In Table 1, the USTS Channelization Code Number is marked with 'C USTS' in a Presence column, since this information is necessary only for the USTS handover. This indicates that the USTS Channelization Code Number is Conditional information which is required only for the USTS service or required only when there exists the USTS Indicator.

In Table 1, USTS offset indicates the scrambling code time offset information. The new cell can approximately synchronize the uplink and the downlink for the UE using a Frame Offset value and a Chip Offset value transmitted from the SRNC. However, the UE employing the USTS does not align the scrambling code start point with the frame start point during transmission of the UL DPCH, so that the new cell must receive the scrambling code time offset information in order to search the scrambling code start point.

The scrambling code time offset value can be defined as a value which is created when the UE employing the USTS sets an offset by separating the scrambling code start point from the frame start point in order to align the UL scrambling codes to the UEs using the same scrambling code. As a result, upon receipt of the scrambling code time offset, the new cell can search the start point of the scrambling code for the UL DPCH depending on the received scrambling code time offset. For example, the scrambling code time offset can be used for the offset value in Table 1.

Table 2 shows a format of the Radio Link Setup Request (or Radio Link Addition Request) message in the W-CDMA mobile communication system supporting the USTS service according to another embodiment of the present invention, wherein one UE uses a plurality of DPDCHs and the same SF.

TABLE 2

| IE/Group Name | Presence | Range | IE type and reference | Semantics description | Criticality | Assigned Criticality |
|---|---|---|---|---|---|---|
| Message Discriminator | M | | 9.2.1.45 | | | |
| Message Type | M | | 9.2.1.46 | | YES | reject |
| CRNC Communication Context ID | M | | 9.2.1.18 | | YES | reject |
| Transaction ID | M | | 9.2.1.62 | | | |
| UL DPCH Information | | 1 | | | YES | reject |
| >UL Scrambling Code | M | | 9.2.2.59 | | | |
| >Min UL Channelisation Code length | M | | 9.2.2.22 | | | |
| >Max Number of UL DPDCHs | C | | 9.2.2.21 | | | |

TABLE 2-continued

| IE/Group Name | Presence | Range | IE type and reference | Semantics description | Criticality | Assigned Criticality |
|---|---|---|---|---|---|---|
| (Removable) | CodeLen | | | | | |
| - Omitted - | | | | | | |
| >USTS Indicator | O | | | | | |
| >USTS Channelisation Code Information | C USTS | 1 to <maxnoofCH> | | | | |
| >>USTS Channelisation Code Number | M | | | | | |
| - Omitted - | | | | | | |
| RL Information | | 1 to <maxnoofRLs> | | | EACH | notify |
| >RL ID | M | | 9.2.1.53 | | | |
| >C-ID | M | | 9.2.1.9 | | | |
| >First RLS Indicator | M | | | | | |
| >Frame Offset | M | | 9.2.1.31 | | | |
| >Chip Offset | M | | 9.2.2.2 | | | |
| >Propagation Delay | O | | 9.2.2.35 | | | |
| >Diversity Control Field | C NotFirstRL | | 9.2.2.7 | | | |
| >USTS offset | C USTS | | | | | |
| - Omitted - | | | | | | |

Table 2 corresponds to a case where a plurality of channelization code nodes are used for one SF. Therefore, in Table 2, USTS Channelisation Code Information indicates a USTS channelization code number which can be repeated as many times as the number of channels assigned to one group and are required every time. Therefore, in Table 2, the USTS Channelization Code Number (USTS CH code NO) indicates a corresponding number in the OVSF code tree for a given SF in Min UL Channelization Code Length. For example, if SF=8, the USTS Channelization Code Number has some of the values 0,1, . . . ,7. Max Number of UL DPDCHs is removable from Table 2.

Table 3 shows a format of the Radio Link Setup Request (or Radio Link Addition Request) message in the W-CDMA mobile communication system supporting the USTS service according to another embodiment of the present invention, wherein one UE uses a plurality of DPDCHs and the different SFs.

TABLE 3

| IE/Group Name | Presence | Range | IE type and reference | Semantics description | Criticality | Assigned Criticality |
|---|---|---|---|---|---|---|
| Message Discriminator | M | | 9.2.1.45 | | | |
| Message Type | M | | 9.2.1.46 | | YES | Reject |
| CRNC Communication Context ID | M | | 9.2.1.18 | | YES | Reject |
| Transaction ID | M | | 9.2.1.62 | | | |
| UL DPCH Information | | 1 | | | YES | Reject |
| >UL Scrambling Code | M | | 9.2.2.59 | | | |
| >Min UL Channelisation Code length (Removable) | M | | 9.2.2.22 | | | |
| >Max Number of UL DPDCHs (Removable) | C CodeLen | | 9.2.2.21 | | | |
| - Omitted - | | | | | | |
| >USTS Indicator | O | | | | | |
| >USTS Channelisation Code Information | C USTS | 1 to <maxnoofCH> | | | | |
| >Min UL Channelisation Code length | M | | | | | |
| >>USTS Channelisation Code Number | M | | | | | |
| - Omitted - | | | | | | |
| RL Information | | 1 to <maxnoofRLs> | | | EACH | notify |
| >RL ID | M | | 9.2.1.53 | | | |
| >C-ID | M | | 9.2.1.9 | | | |
| >First RLS Indicator | M | | | | | |
| >Frame Offset | M | | 9.2.1.31 | | | |
| >Chip Offset | M | | 9.2.2.2 | | | |
| >Propagation Delay | O | | 9.2.2.35 | | | |
| >Diversity Control Field | C NotFirstRL | | 9.2.2.7 | | | |
| >USTS offset | C USTS | | | | | |
| - Omitted - | | | | | | |

Table 3 corresponds to a case where a plurality of channelization code nodes are used for several SFs. In this case, Min UL Channelization Code Length and Max Number of UL DPDCHs are removable from Table 3. In Table 3, USTS Channelization Code Information indicates Min UL Channelization Code Length for SF information and a USTS channelization code number, which can be repeated as many times as the number of channels assigned to one group and are required every time. Therefore, in Table 3, the Min UL Channelization Code Length can have one of the values 4, 8, 16, 32, 64, 128 and 256. In each case, the USTS Channelization Code Number indicates a corresponding number in the OVSF code tree for a given SF in Min UL Channelization Code Length. For example, if SF=8, the USTS Channelization Code Number has some of the values 0,1, . . . ,7.

It is assumed in Tables 1 to 3 that the channelization code for the UL DPCCH is not notified with separate information. That is, it is possible not to notify the separate information by previously determining a specific rule between the DPDCH and the DPCCH such that a specially mapped SF=256 channelization code node should be used for the DPCCH, when a certain OVSF code node is assigned to the channelization code for the DPDCH. Of course, when the channelization code node to be used for the DPCCH is not previously designated, information indicating the channelization code node for the DPCCH must be additionally inserted in the above tables. Since the SF=256 channelization code node is always used for the DPCCH, it is necessary to notify information about which of SF=0 to SF=254 code nodes is to be used.

Meanwhile, the UL scrambling code of a UE operated based on USTS can be transmitted in the same form as information transmitted on a typical DPCH. Because the UL scrambling code is for USTS in the cell, a new cell to which the UE hands over a call must know the USTS scrambling code beforehand. USTS scrambling codes are known in many ways.

(1) The first way is to transmit the USTS indicator. A cell receiving the USTS indicator (a corresponding Node B or RNC) recognizes the UE uses USTS and a different handover from that of a typical DPCH is required.

(2) Some of UL scrambling codes are preset for USTS in the same manner as saving part of the UL scrambling codes for RACHs or CPCHs. Then, the SRNC transmits the UL scrambling codes for USTS to the Node B or RNC so that the Node B or RNC can recognize that the UE uses the USTS.

(3) The third way relies on presence or absence of channelization code information. If there exists information about the scrambling code and DPCCH channelization code of the UE using the USTS, this implies that it can be determined the handover UE uses the USTS. It is because such channelization code information is different from that for a typical DPCH.

Once the UE succeeds in establishing a new radio link, it can continue the USTS service in one cell and perform a general DPCH or USTS service in other cells. If this procedure is repeated, there may exist the case where one UE is connected to one cell by a USTS service and to at least one other cell on a DPCH. In this case, the UE collectively receives data from the plurality of cells as one piece of information. The cell, with which the UE communicates for the USTS service, may utilize part of TPC information for a different use, that is, as a TAB (Time Alignment Bit) for tracking. Accordingly, the UE needs to recognize the TAB separately from the information received from the cells.

Now, the operations of each UE, the SRNC, and the Node B for a handover of a UE using the USTS will be described below.

The UE transmits UL data while maintaining the USTS service. That is, the UE establishes a new radio link while maintaining the USTS service where a scrambling code start point can differ from a frame start point, i.e., the start point of an uplink data frame, and then receives data from different cells collectively as one piece of information. Since the cell connected to the UE by the USTS service may use part of TPC information as a TAB for tracking, the UE interprets the TAB separately from TPC information received from the other cells. Thus, the UE maintains tracking for the USTS using the TAB from the USTS-connected cell, and neglects TPC information received from the other cells at the same time point or uses it for power control.

A description of the SRNC will be given below with reference to FIG. 12.

Figure 12:
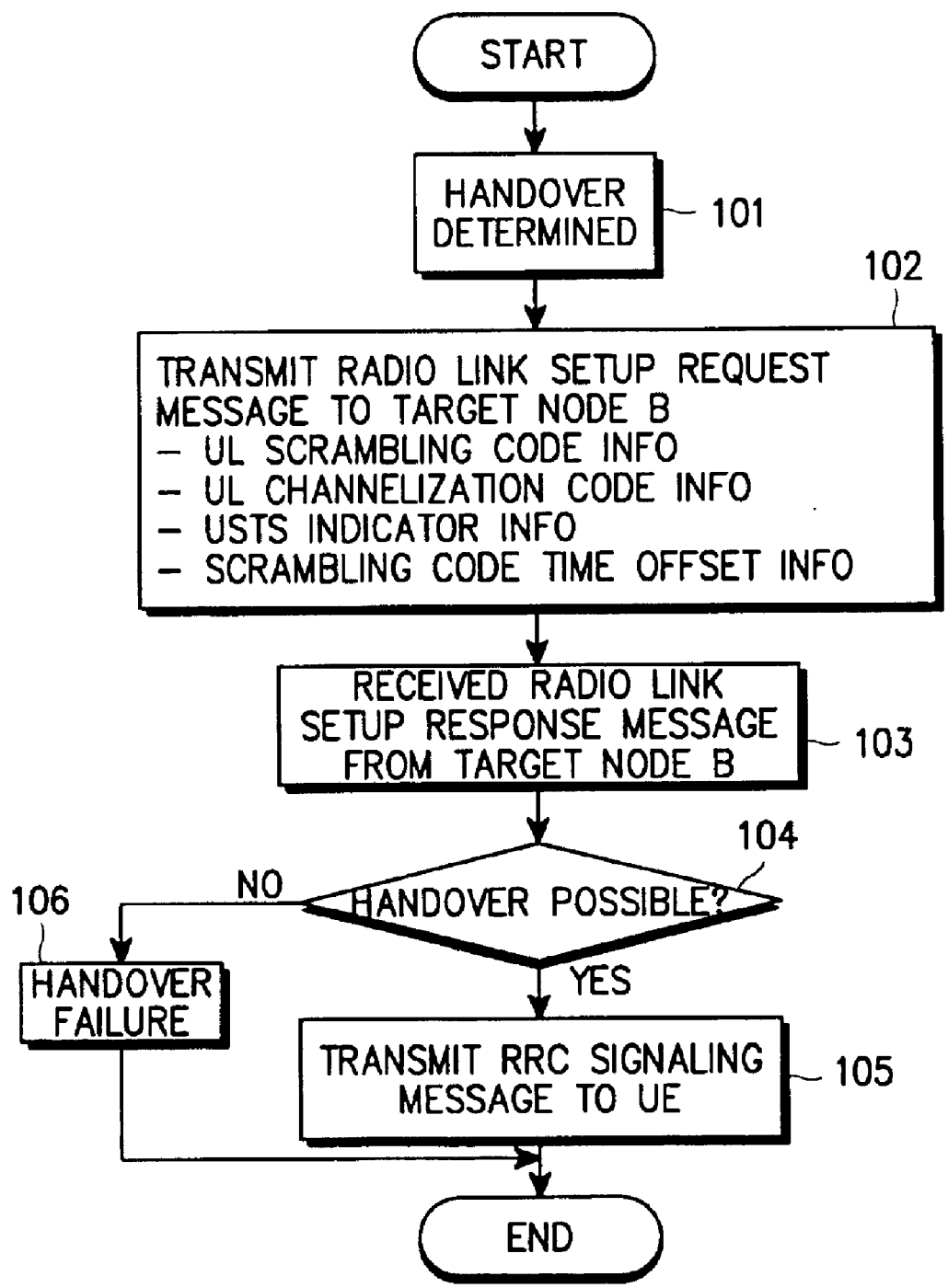
FIG. 12 is a flowchart illustrating the operation of a Serving RNC (SRNC) during a handover according to the present invention.

FIG. 12 is a flowchart illustrating the operation of the SRNC during a handover. In step 101, the SRNC receives a measurement report from the UE and determines a handover for the UE. The SRNC transmits a Radio Link Setup Request message to the Node B of a new cell in step 102. The Radio Link Setup Request message includes USTS parameters for a USTS handover. The USTS parameters are the UL scrambling code information, the UL channelization code information, the USTS indicator information, and the scrambling code time offset information. The USTS parameters, information about the UE using the USTS, are stored in the SRNC. In step 103, the SRNC receives a Radio Link Setup Response message from the target Node B in response to the Radio Link Setup Request message. The SRNC determines whether the handover is possible by analyzing the Radio Link Setup Response message in step 104. If the USTS handover is possible, the SRNC goes to step 105, and otherwise, the SRNC goes to step 106.

It can be determined that the USTS handover is impossible in step 104 in the following cases: (1) the target Node B does not support the USTS; (2) although the target Node B supports the USTS, it does not support the USTS handover; or (3) the USTS handover fails as in the conventional technology. In step 105, the SRNC transmits an RRC signaling message to the UE for handover. Here, the RRC signaling message is an Active Set Update message containing the same contents as a message transmitted during a handover in the conventional technology. Meanwhile, the SRNC ends the procedure with the USTS maintained, considering the handover is failed in step 106.

In the above description of the USTS handover, it is assumed that the SRNC is identical to a CRNC and the new cell is in a different Node B. If the new cell is in the same Node B, the Radio Link Setup Response message is replaced by a Radio Link Addition Request message in the case of FIG. 6. On the other hand, if the SRNC is different from the CRNC, that is, the UE is connected to the SRNC via a DRNC, the SRNC transmits the USTS parameters to the target Node B via the DRNC in step 102. Here, the Radio Link Setup Response message being an RNSAP message is used between the SRNC and the DRNC. The DRNC transmits the USTS parameters by a Radio Link Setup Response message being an NBAP message to the target Node B.

Figure 13:
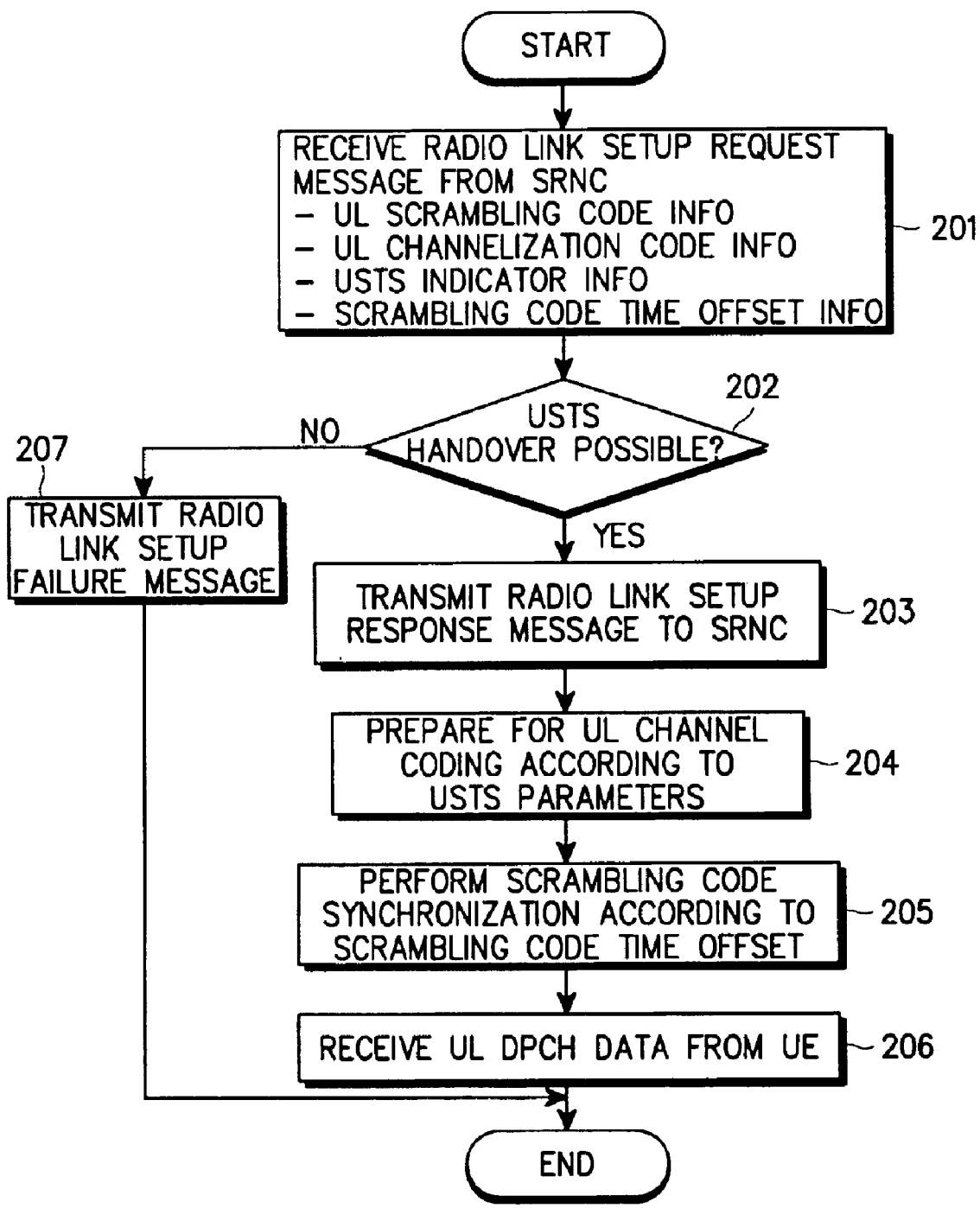
FIG. 13 is a flowchart illustrating the operation of the Node B in a new cell for the handover according to the present invention.

Referring to FIG. 13, the operation of the Node B will be described.

FIG. 13 is a flowchart illustrating the operation of the Node B in a new cell for the handover. In step 201, the target Node B receiving the handover request receives a handover-related message from the SRNC in step 201. It is assumed herein that the new cell is in a different Node B from that of the UE. Therefore, the handover-related message is an NBAP message, a Radio Link Setup Response message. On the other hand, if the new cell is in the same Node B, the handover-related message is a Radio Link Addition Request message. The Radio Link Setup Response message includes the USTS parameters, that is, the UL scrambling code information, UL channelization code information, USTS indicator information, and scrambling code time offset information, as stated before.

In step 202, the target Node B determines whether the USTS handover is possible. That is, upon receipt of the Radio Link Setup Response message, the target Node B determines whether it will support the USTS handover. If the USTS handover is impossible, the target Node B transmits a Radio Link Setup Failure message to the SRNC in step 207 and ends the procedure.

If the handover is possible in step 202, the target Node B transmits the Radio Link Setup Response message to the SRNC in response to the received Radio Link Setup Request message in step 203 and prepares for UL channel coding according to the USTS parameters set in the received Radio Link Setup Response message in step 204. In step 205, the target Node B performs scrambling code synchronization by the difference between a frame start point and a scrambling code start point according to the scrambling code time offset. Specifically, the target Node B shifts the scrambling code from the frame start point by the scrambling code time offset for synchronization of scrambling codes to thereby prepare for spreading. In step 206, the target Node B receives the UL DPCH data from the UE using the results prepared in steps 204 and 205 and ends the procedure.

In the description of the handover operation of the target Node B, the target Node B knows that the UE is receiving the USTS service from the cell of a different Node B or the cell of the same Node B. Therefore, the target Node B can also recognize that the UE continues synchronization by tracking at every frame according to the USTS service. To synchronize at a frame level, the UE can transmit UL data on a 1/n chip basis and thus it operates suitably. Or the fact that the UE may not respond to the last TPC value can be utilized.

In another embodiment of the present invention, conversion (or switching) from a typical DPCH connection state (i.e., a normal mode or a non-USTS mode) to a USTS mode will be described.

If the SRNC determines that the UE operating in the USTS mode becomes remote from the cell providing the USTS service, it discontinues the USTS service and uses the typical DPCH, or performs the USTS operation in a cell with the highest signal strength. The USTS operation is a Radio Link Reconfiguration procedure. Here, the SRNC determines from a measurement received from the UE that the UE is moving outside of the USTS service-providing cell. The mode conversion covers conversion of a USTS mode, a normal mode, and a non-USTS mode.

By the Radio Link Reconfiguration procedure, the SRNC terminates the USTS mode of the UE and transitions the UE to a normal mode or a non-USTS mode, or vice versa. Both conversions may occur simultaneously.

The normal mode refers to assignment of a typical DPCH to the UE. The non-USTS mode, used discriminatively from the normal mode, occurs to a UE which being requested to establish a radio link with a new cell due to its mobility in the USTS mode, is connected to other cells by typical DPCHs, while maintaining the USTS service with the current serving cell.

For conversion from the normal mode to the USTS mode, information set in the Radio Link Setup message or the Radio Link Addition message is transmitted by the Radio Link Reconfiguration message. When the UE requesting conversion to the USTS mode is connected to a new cell by handover, the UE and the new cell can be connected on typical DPCHs. If the UE is released from the connection to the old UTST service providing cell, the UE receives a general DPCH service. If the new cell is capable of providing the USTS service, the SRNC can convert the normal mode to the USTS mode again by the Radio Link Reconfiguration procedure.

Mode conversions of the UE will be described hereinbelow. Two cases can occur to a UE receiving the USTS service from a cell on a radio link. The one is that the UE becomes the first to be assigned to a USTS scrambling code, and the other is that the UE is assigned to a scrambling code while a USTS scrambling code is in use for other UEs for the USTS service.

As to the former case, (1) the SRNC transmits information about UL scrambling codes for USTS and UL DPDCH and DPCCH channelization code information, that is, USTS parameters to the Node B. The USTS parameters are transmitted by a Radio Link Reconfiguration message or another signaling message. (2) The Node B transmits time information measured on the radio link established with the SRNC. The time information is one of the time difference between the start point of a current received UE frame and that of a P-CCPCH frame, a value required to make the time difference is 256 chips×m, and a PD. The PD is calculated by subtracting $T_0$ from the difference between the start points of a corresponding DP DPCH frame and a UL DPCH frame. (3) The SRNC transmits time information received from the Node B to the UE. (4) The UE transmits on the uplink for USTS using the time information.

In the case whether the UE is the first to be assigned to a USTS scrambling code, the UE, the SRNC, and the Node B operate in the following as compared to the conventional ones.

The UE requests conversion to the USTS mode to the Node B during communicating on a DPCH, or the Node B attempts conversion to the USTS mode for the UE that is placed in a normal mode or a non-USTS mode after the USTS mode.

The UE transmits UL DPCH data based on a time offset for USTS in the information received from the SRNC for conversion to the USTS mode. If the time offset is 0, the UE performs the conventional DPCH operation. On the contrary, if the time offset is not 0, the UE performs synchronization by the time offset. The time offset is information required to make the difference between the start points of a current received UE frame and a P-CCPCH frame be 256chips×m, that is, time information representing how much earlier or later the UE should transmit a UL DPCH with respect to the previous UL DPCH, or information about a PD generated during transmission of a UL DPCH. Upon receipt of the PD, the UE transmits the UL DPCH earlier by the PD.

The SRNC determines the time offset, and the UE receiving the time offset transmits the UL DPCH earlier or later by the time offset. If the UE is the first one to transition to the USTS mode, that is, there is no UE receiving the USTS service, the UE becomes a reference for the other UEs. If a USTS scrambling code is synchronized based on a P-CCPCH, the UE can perform scrambling code synchronization. In this case, the SRNC transmits time information for the scrambling code synchronization and the UE, upon receipt of the time information, delays the scrambling code by the time offset prior to transmission. The scrambling code synchronization is performed by the UE scrambling code synchronizer shown in FIG. 4.

Now the operation of the SRNC will be described with reference to FIG. 14.

Figure 14:
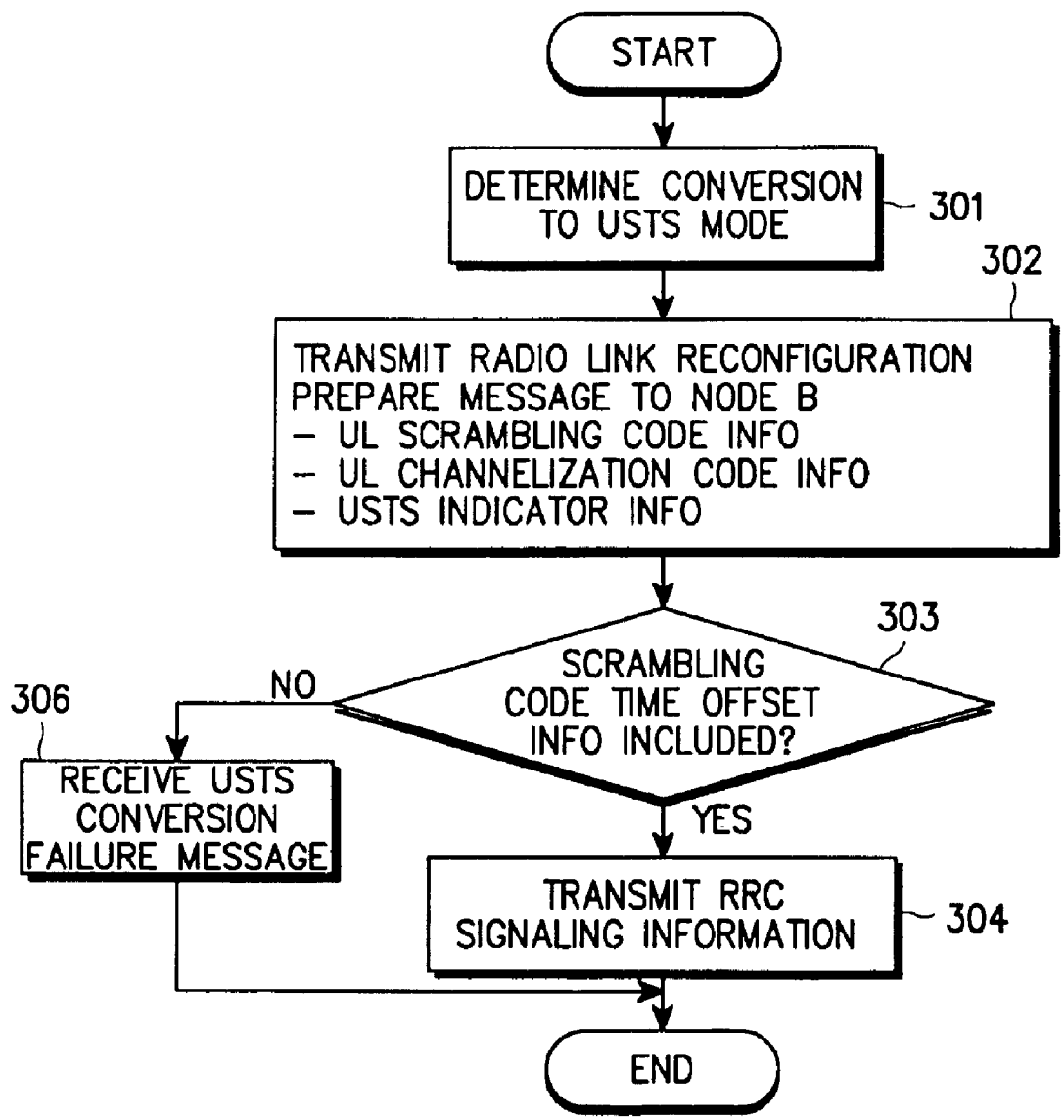
FIG. 14 is a flowchart illustrating the operation of the SRNC when the UE is transitioned to the USTS mode during communication on a DPCH according to the present invention.

FIG. 14 is a flowchart illustrating the operation of the SRNC when the UE is transitioned to the USTS mode during communication on a DPCH. Referring to FIG. 14, the SRNC determines conversion to the USTS mode for the UE communicating on the DPCH according to a measurement report received from the UE in step 301. Conversion to the USTS mode can be determined upon request from the UE. In step 302, the SRNC transmits a Radio Link Reconfiguration Prepare message to the Node B of a corresponding cell in step 302. The Radio Link Reconfiguration Prepare message includes USTS parameters. The USTS parameters are information about a UL scrambling code, a UL channelization code, and a USTS indicator. The USTS parameters are determined by the SRNC. The operation of FIG. 14 is described on the premise that the SRNC is identical to a CRNC. If the SRNC is different from the CRNC, the SRNC transmits the above information to a DRNC and the DRNC transmits the received information to the Node B. If the SRNC is different from the DRNC, the SRNC transmits only the USTS indicator information to the DRNC. Then, the DRNC determines a UL scrambling code and a UL channelization code for USTS and transmits the codes to the Node B and the SRNC. If the SRNC can determine a scrambling code time offset in step 302, the SRNC transmits the determined scrambling code time offset together with USTS parameters to the Node B. For example, if the SRNC receives the PD and an RTT (Round Trip Time) from the Node B through a measurement procedure, it can determine the scrambling code time offset. Time information about 256×m basis synchronization and scrambling code synchronization can be added to the scrambling code time offset information.

In step 303, the SRNC determines whether to transition the UE to the USTS mode by analyzing a message received from the Node B. Specifically, the SRNC determines whether a Radio Link Reconfiguration Response message including the scrambling code time offset has been received from the corresponding Node B. If the received message is not the Radio Link Reconfiguration Response message, the SRNC goes to step 306. If the received message is not the Radio Link Reconfiguration Response message, it is then a USTS conversion failure message indicating the failure of the Radio Link Reconfiguration Prepare message. In step 306, the SRNC determines that it is impossible to transition the UE to the USTS mode by the USTS conversion failure message. The USTS conversion is failed when the Node B does not support the USTS, or in the failure cases as described according to the conventional technology.

Meanwhile, if the SRNC receives the Radio Link Reconfiguration Response message from Node B in step 303, the SRNC analyses the scrambling code time offset information for USTS set in the Radio Link Reconfiguration Response message in step 304. The Radio Link Reconfiguration Response message may include the scrambling code time offset itself, or the time difference between the start point of a current received UE frame and that of a P-CCPCH frame, a value required to make the time difference be 256 chips×m, and a PD. The PD is the mean value ½ of the value calculated by subtracting $T_0$ from the difference from the start points of a corresponding DL DPCH and the UL DPCH.

In addition, the Radio Link Reconfiguration Response message may include a plurality of pieces of information at the same time. While it is assumed in FIG. 14 that the SRNC is identical to the CRNC, if the SRNC is different from the CRNC, the SRNC receives the above information from the DRNC and the DRNC receives the information from the Node B. The PD in the information can be obtained from the Node B using a measurement procedure instead of receiving it during the USTS mode conversion. The PD can be a value resulting from the measurement procedure or from a predefined RRT. The RRT is defined as the difference between the start points of a corresponding DL DPCH and a UL DPCH. From the RRT, the PD ($=(RTT-T_0)/1$) is obtained.

After analyzing the Radio Link Reconfiguration Response message, the SRNC transmits an RRC signaling message to the UE to transition to the USTS mode and then ends the procedure. A Radio Bearer Reconfiguration Prepare message, for example, is used as the RRC signaling message. The SRNC transmits time information and channel information of the UE received from the Node B, including the UL scrambling code, the UL channelization code, the USTS indicator, and the time offset by the RRC signaling message.

Finally, a description of the Node B during the USTS mode conversion will be given with reference to FIG. 15.

Figure 15:
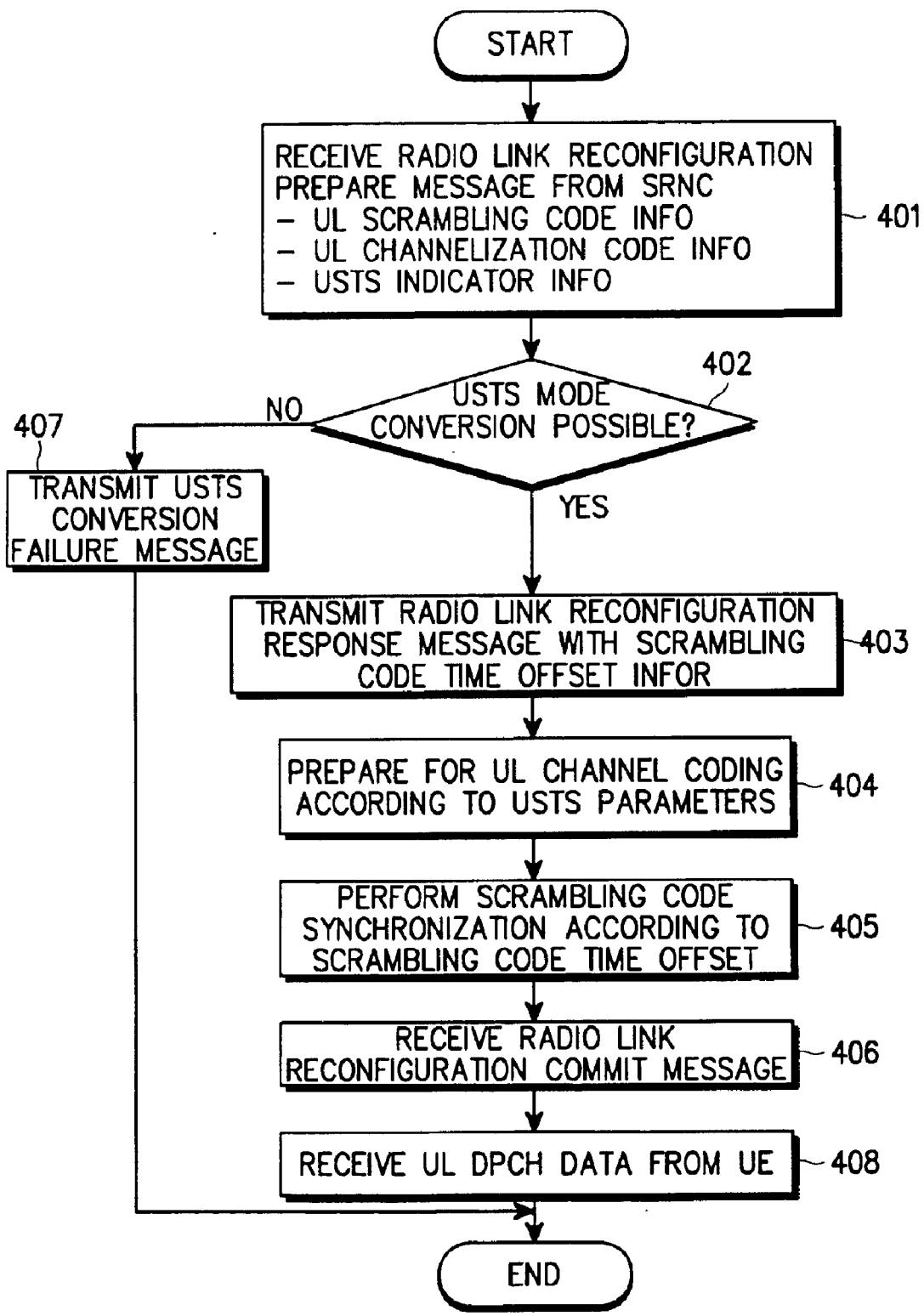
FIG. 15 is a flowchart illustrating the operation of the Node B when the UE communicating on a DPCH transitions to the USTS mode according to the present invention.

FIG. 15 is a flowchart illustrating the operation of the Node B when the UE communicating on a DPCH transitions to the USTS mode. Referring to FIG. 15, the Node B receives a USTS mode-related message from the SRNC in step 401. An NBAP message for the USTS mode conversion is, for example, the Radio Link Reconfiguration Prepare message. The received Radio Link Reconfiguration Prepare message includes information required for conversion to the USTS mode, inclusive of the UL scrambling code, the UL channelization code, and the USTS indicator.

In step 402, the Node B determines whether it is possible to transition to the USTS mode. If the USTS mode conversion is possible, the Node B goes to step 403. If the USTS mode conversion is impossible, the Node B goes to step 407.

In step 407, the Node B transmits the Radio Link Reconfiguration Failure message to the SRNC and ends the procedure.

On the other hand, if the USTS mode conversion is possible, the Node B transmits the Radio Link Reconfiguration Response message with the scrambling code time offset information to the SRNC in step 403. The Radio Link Reconfiguration Response message may include the scrambling code time offset itself, or the time difference between the start point of a current received UE frame and that of a P-CCPCH frame, a value required to make the time difference equal 256 chips×m, and a PD. If the Node B has transmitted the PD or a related RTT to the SRNC beforehand by the measurement procedure, the SRNC may determine time information for a 256×m basis synchronization or scrambling code synchronization and transmit the time information to the Node B. In this case, there is no need to add the time information to the Radio Link Reconfiguration Response message and the Node B can obtain information about the reception point of a UL DPCH based on the time information received from the SRNC. Here, the time information can be $T_{all}$ or $T_{add}$ in the present invention.

The Node B prepares UL channel coding according to the scrambling code, the UL channelization code, and the USTS indicator in step 404. That is, the Node B checks the UL scrambling code and the DPDCH and DPCCH channelization codes and prepares them. In step 405, the Node B implements the scrambling code synchronization by determining the difference between a frame start point and a scrambling code start point according to the scrambling code time offset information. The Node B shifts the scrambling code by the scrambling code time offset from the frame start point and then prepares for spreading. If the UE is the first one to use a USTS scrambling code, the scrambling code time offset is 0 and the frame start point can be rendered identical to the scrambling code start point. However, if the USTS scrambling code synchronization is based on a P-CCPCH, even if the UE is the first one to use the USTS scrambling code, the scrambling code time offset may not be 0. In this case, the Node B delays the scrambling code by the scrambling code time offset and prepares to receive a UL DPCH. The scrambling code synchronization can be performed in a scrambling code synchronizer in the Node B that is symmetrical in structure to its counterpart shown in FIG. 4. The scrambling code synchronizer in the Node B will be described later.

The Node B receives a Radio Link Reconfiguration Commit message acknowledging the USTS mode conversion from the SRNC. The Radio Link Reconfiguration Commit message has time information for the USTS mode conversion and the Node B prepares to receive a UL signal at a time indicated by the time information. In step 408, the Node B receives UL DPCH data from the UE transitioned to the USTS mode and ends the procedure.

The structure of the aforementioned scrambling code synchronizer will be described with reference to FIG. 16.

Figure 16:
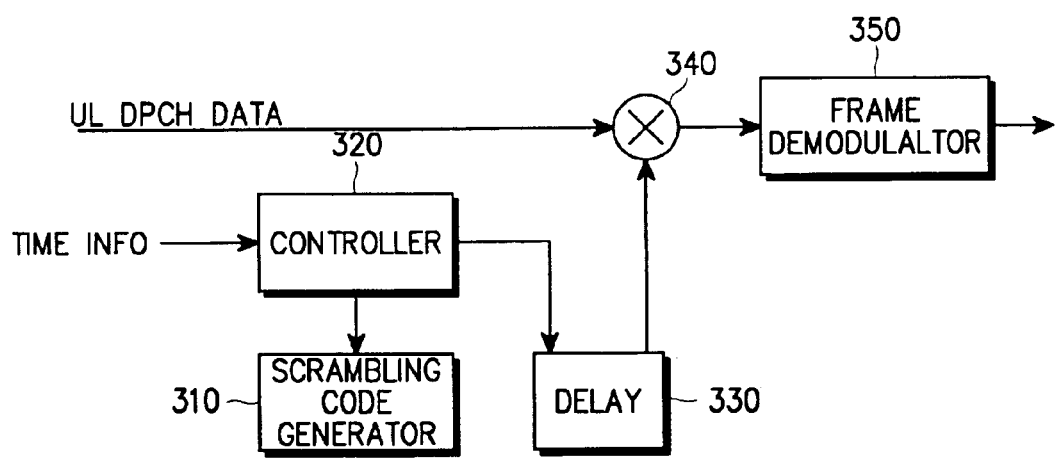
FIG. 16 is a block diagram illustrating a structure of a scrambling code synchronizer in a Node B according to the present invention.

FIG. 16 is a block diagram of a scrambling code synchronizer in a Node B according to the present invention. Referring to FIG. 16, a scrambling code generator 310 generates a scrambling code for a UL DPCH assigned to the UE. A controller 320 receives USTS time information of the UE and controls the scrambling code generator 310 or a delay 330 based on the difference between the start point of the received UL DPCH and a scrambling code start point. The delay 330 delays the scrambling code by a scrambling code time offset according to a time information command received from the controller 320 to make the start points of the scrambling code and a frame identical. A multiplier 340 receives the UL DPCH data and multiplies the received UL DPCH data by the scrambling code received from the delay 330. A frame demodulator 350 demodulates the data received from the multiplier 340 using a channelization code.

The case where other UEs are using a scrambling code will be described below.

The SRNC transmits information about UL scrambling codes in use for USTS, UL DPDCH and DPCCH channelization codes, and a scrambling code start point serving as a reference time for the other UEs to the Node B. The information is transmitted by, for example, the Radio Link Reconfiguration message. The scrambling code start point information may include information for 256×m basis synchronization and scrambling code synchronization. Then the Node B transmits time information measured using an established radio link, that is, a PD measurement to the SRNC. The PD is calculated by subtracting $T_0$ from the difference between the start points of a corresponding DL DPCH and a UL DPCH. The SRNC transmits the time information (PD) received from the Node B to the UE and the UE transmits data on the uplink for USTS according to the received time information.

In the case whether other UEs are using a scrambling code for the USTS service, the UE, the SRNC, and the Node B operate as described below, in comparison with the conventional UEs.

The UE requests conversion to the USTS mode to the Node B during communicating on a DPCH, or the Node B attempts conversion to the USTS mode for the UE that receives a service on a DPCH only after the USTS mode. The UE transmits UL DPCH data based on a time offset for USTS in the information received from the SRNC for conversion to the USTS mode. If the time offset is 0, the UE performs the conventional DPCH operation. On the contrary, if the time offset is not 0, the UE performs synchronization by the time offset. The time offset includes information required to make the difference between the start points of a current received UE frame and a P-CCPCH frame equal to 256 chips×m, that is, time information representing how much earlier or later the UE should transmit a UL DPCH with respect to the previous UL DPCH, or information about a PD generated during transmission of a UL DPCH. If the UE receives the PD, it transmits the UL DPCH earlier by a time equal to the PD.

The SRNC determines the time offset and the UE receiving the time offset transmits the UL DPCH earlier or later by the time offset. If USTS scrambling code synchronization is based on a P-CCPCH, the SRNC transmits time information for the scrambling code synchronization and the UE delays a scrambling code by the time offset prior to transmission. The scrambling code synchronization can be performed by use of the scrambling code synchronizer shown in FIG. 4. Even if the scrambling code synchronization is based UE time, the SRNC transmits a corresponding offset to the UE and the UE performs the scrambling code synchronization according to the received time offset.

In the case where other UEs are using a scrambling code for the USTS service, the SRNC operates in the same manner as during the USTS mode conversion for the UE when it is the first one to be assigned to a scrambling code for the USTS service. Therefore, a description of the operation of the SRNC will be omitted.

The Node B also operates in the same manner as when the UE is the first one to be assigned to a scrambling code for the USTS service, except that it transmits different information in step 402 of FIG. 15.

In step 402, the Node B notifies the SRNC whether it will support the USTS mode conversion by a response message. Here, the Node B transmits the scrambling code time offset to the SRNC.

To supply information about the scrambling code time offset, the Node B transmits one of the time difference between the start points of a current received UE frame and a P-CCPCH frame, a value required to make the time difference equal 256 chips×m, a PD, and the time difference between the start points of a scrambling code and a corresponding frame. When the UE is the first one to be assigned to a scrambling code for the USTS service, there is no scrambling code serving as a reference, whereas when other UEs are operating in the USTS mode, the start point of the scrambling code in use for the UEs serves as a reference point. Therefore, a scrambling code offset is generated with respect to the scrambling code start point.

In the case where a target cell does not support a handover for the USTS service, the SRNC and the UE operate as follows.

In this case, the SRNC discontinues the USTS service based on a measurement report received from the UE and determines to establish a radio link with the new cell by the Radio Link Setup procedure or the Radio Link Addition procedure. Here, the SRNC converts the USTS mode to the normal mode for the UE by the Radio Link Reconfiguration procedure. The SRNC transmits the Active Set Update message or the Radio Bearer Reconfiguration message to notify the UE of the mode conversion procedure.

That is, the UE that was receiving the USTS service implements a handover in the following way.

After transmitting the Radio Link Setup Response message to the RNC or Node B of the new cell, the SRNC receives a response message from the RNC or Node B. If the SRNC receives information representing that the new cell does not support the USTS service by the response message, or has the information beforehand, it transmits the Radio Link Reconfiguration Prepare message to the Node B or RNC of an existing cell (one or more radio links may exist) to convert the USTS mode to the normal mode for the UE. Then, the SRNC discontinues the USTS service for the UE and transmits a message for a typical DPCH service, for example, the Radio Bearer Reconfiguration signaling message. Signaling messages transmitted in the above second and third steps include time parameters or separate signaling messages indicating time are transmitted, so that the UE and each cell discontinue the USTS at the same time and use DPCHs.

If the UE that was using the USTS is to establish a new radio link in a handover region, the SRNC transmits the Radio Link Setup Response message or the Radio Link Addition Request message to a corresponding RNC or Node B. Upon receipt of the request message, the DRNC or Node B can transmit a response message to notify whether it supports the handover or not. The response message can be the Radio Link Setup Response message or the Radio Link Addition response message, as given in Table 4 below.

or not. USTS Support Indicator is conditional because it is transmitted only when the SRNC requests a USTS handover to the Node B. If the Node B transmits information indicating whether it supports the USTS service regardless of request from the SRNC, C-USTS can be replaced to M (Mandatory), a parameter indicating that it is mandatory.

In the foregoing embodiment, when a UE performs a handover, the UE can simultaneously have a cell connected in the USTS service and a cell having set the normal DPCH connection, i.e., a cell connected in the non-USTS mode. That is, when the UE ends connection with the cell connected in the USTS service as it moves to the cell having set the normal DPCH connection (i.e., the cell communicating in the non-USTS mode), the cell having set the normal DPCH connection can set connection for the USTS service again. Of course, in the handover region, it is possible to simultaneously switch the connection of the cell having set the normal DPCH connection to the connection for the USTS service, and to switch the connection for the USTS service to the connection for the normal DPCH.

When the UE switches from the normal DPCH connection to the connection for the USTS service, it must perform slot unit or 256×m-chip unit synchronization and scrambling synchronization based on reception time information received from the Node B. The embodiment of the present invention can perform synchronization using time offset-related information, e.g., information on PD and $T_{add}$, transmitted from the Node B. Since the UE currently transmits the DPCH in the synchronization process, there is a probability that data on the currently transmitted DPCH will

TABLE 4

| IE/Group Name | Presence | Range | IE type and reference | Semantics description | Criticality | Assigned Criticality |
|---|---|---|---|---|---|---|
| Message Discriminator | M | | 9.2.1.45 | | | |
| Message Type | M | | 9.2.1.46 | | YES | Reject |
| CRNC Communication Context ID | M | | 9.2.1.18 | | YES | Reject |
| Transaction ID | M | | 9.2.1.62 | | | |
| Node B Communication Context ID | M | | 9.2.1.48 | The reserved value All NBCC shall not be used | YES | ignore |
| Communication Control Port ID | M | | 9.2.1.15 | | YES | ignore |
| RL Information Response | | 1 to <maxnoofRLs> | | | EACH | ignore |
| >RL ID | M | | 9.2.1.53 | | | |
| >RL Set ID | M | | 9.2.2.39 | | | |
| >UL interference level | M | | 9.2.1.67 | | | |
| >Diversity Indication | C-NotFirstRL | | 9.2.2.8 | | | |
| >CHOICE diversity> Indication | | | | | | |
| >>Combining | | | | | YES | ignore |
| >>>RL ID | M | | 9.2.1.53 | Reference RL ID for the combining | | |
| >>Non Combining or First RL | | | | | YES | ignore |
| >>>DCH Information Response | | 0 to <maxnoofDCHs> | | Only one DCH per set of coordinated DCH shall be included | | |
| >>>>DCH ID | M | | 9.2.1.20 | | | |
| >>>>Binding ID | M | | 9.2.1.4 | | | |
| >>>>Transport Layer Address | M | | 9.2.1.63 | | | |
| >DSCH Information Response | | 0 to <Numof DSCH> | | | GLOBAL | ignore |
| >>DSCH ID | M | | 9.2.1.27 | | | |
| >>Binding ID | M | | 9.2.1.4 | | | |
| >>Transport Layer Address | M | | 9.2.1.63 | | | |
| >SSDT Support Indicator | M | | 9.2.2.46 | | | |
| >USTS Support Indicator | C-USTS | | | | | |
| Criticality diagnostics | O | | 9.2.1.17 | | YES | ignore |

In Table 4, USTS Support Indicator indicates whether cells in a corresponding Node B support the USTS service be lost as the result of the uplink synchronization in the above method. For example, when a value for the 256×m basis synchronization is a negative number, the UE must transmit the UL DPCH before the existing transmission point. In this case, there is a great possibility that the data on the UL DPCH having being previously transmitted before the synchronization will be lost.

Figure 17:
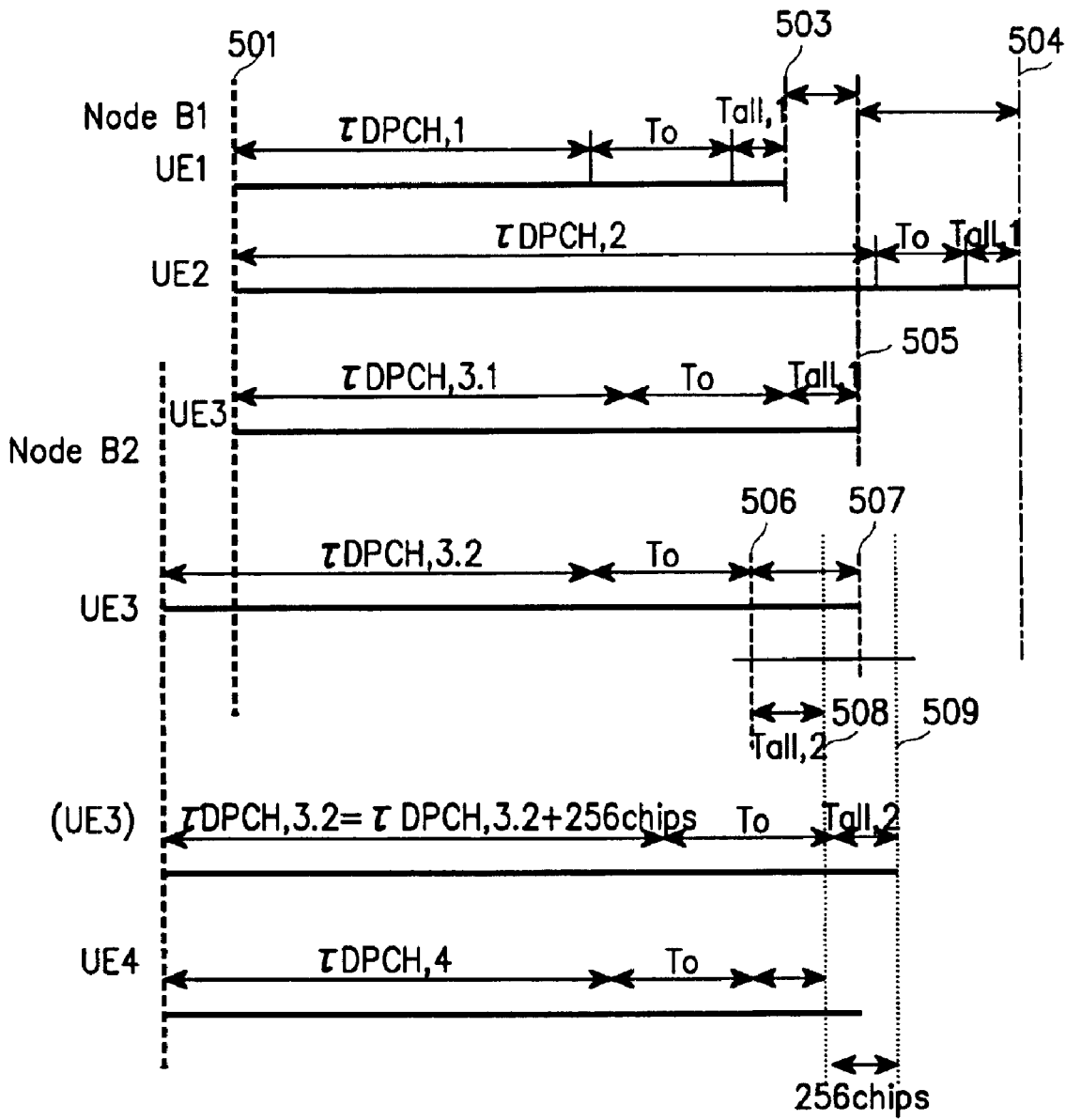
FIG. 17 illustrates reception points of the UEs in the respective Node Bs.

FIG. 17 illustrates reception points of the UEs in the respective Node Bs, and in particular, illustrates a relationship between time axes in a given time period. In FIG. 17, reference numeral 501 represents a P-CCPCH frame start point in a Node B1. The P-CCPCH frame start point 501 is repeated one frame later, and FIG. 17 illustrates the timing of one repetition period. Reference numeral 502 represents a P-CCPCH frame start point in a Node B2. Since the Node Bs are not synchronized with each other in the asynchronous mobile communication system, the frame start point 501 is not time-aligned with the frame start point 502. Reference numeral 503 represents a reception (or arrival) point of the UL DPCH from a UE1. In FIG. 17, UE1, UE2 and UE3 represent UEs provided with the USTS service from the Node B1, while UE4 represents a UE provided with the USTS service from the Node B2. In particular, it will be assumed that the UE3 is on the handover between the Node B1 and the Node B2, and the UE3 operates in the USTS mode where it is provided with the USTS service, in the Node B1, while the UE3 operates in the non-USTS mode where it uses the normal DPCH, in the Node B2. In addition, it will also be assumed that the UE3 represents a UE that has been provided with the USTS service in the Node B1 and then is to be provided with the USTS service in the Node B2 through the handover.

The Node B1 receives the UL DPCH from the UE1 at the point 503 after a lapse of $\tau_{DPCH,1}$ plus $T_0$ plus $T_{all,1}$ from the start point 501 of the P-CCPCH. As described in the above embodiments, the Node B1 enables UE1 to receive the UL DPCH at the point 503, through time alignment with the UE1 using the USTS service. Reference numeral 504 represents a reception point of UL DPCH from the UE2 and reference numeral 505 represents a reception point of UL DPCH from the UE3. The points 503, 504 and 505 are time-aligned such that a time offset between them should become a multiple of 256. Reference numeral 507 represents a point where UL DPCH from the UE3 is received at the Node B2, and reference numeral 506 represents a point after a lapse of $\tau_{DPCH,3,2}$ plus $T_0$ from the start point 502 of the P-CCPCH from the UE3. A time offset between the point 506 and the point 507 may be different from the $T_{all,1}$ value due to the difference of the propagation delay values because the distance between the UE3 and the Node B2 is difference from the distance between the UE3 and the Node B1. In order for the UE3 to start the USTS service in the Node B2, time alignment must be performed on the reception point of the UL DPCH from the UE3. Here, the Node B2 should be able to receive the UL DPCH from the UE3 at a point 508 after a lapse of $T_{all,2}$ from the point 506. However, when the Node B2 is time-aligned to receive the UL DPCH from the UE3 at the point 508, the data to be transmitted at a period between the point 508 and the point 507 may be lost. That is, since the transmission point of the UL DPCH is forcedly shifted to the point 507 to time-align the transmission point to the point 507 for the time alignment from the actual transmission point 508 of the UL DPCH, the UL DPCH data previously transmitted from the Node B2 may be lost. Therefore, it is possible to prevent a loss of the data transmitted over the UL DPCH by allowing the Node B2 to receive the UL DPCH at a point 509, which is 256 chips behind the point 508, for the time alignment.

Therefore, in the case where the UE is on the handover or is required to switch from the non-USTS mode to the USTS mode, if the UL DPCH should be received earlier in the case of the slot or 256×m-chip unit synchronization, the SRNC shifts the reception point such that the UL DPCH should be received after a lapse of 256×k chips (where k is an integer larger than '0'), for synchronization of the UE. However, when the UE performs the handover more than once, the UL DPCH received at the Node B after the lapse of 256×k chips is accumulated. Thus, an increase in the time difference between the transmission point of the DL DPCH and the reception point of the UL DPCH may cause a power control problem of the DPCH. That is, the increase in the time difference may affect the power control technique in which the UE transmits a power control command over the UL DPCH using a reception power level of DL DPCH received from the Node B, and the Node B transmits a power control command over the DL DPCH after receiving the UL DPCH the from the UE. Therefore, in order to solve the above problems, the present invention provides a method for simultaneously controlling the transmission points of the DL DPCH and the UL DPCH, when the 256×k value is so large as to affect the power control operation of the system in the handover process or in a process where the UE switches from the non-USTS mode to the USTS mode.

The handover process or the USTS service switching process will be described in detail with reference to an embodiment of the present invention, which uses the $T_{all}$ value and the $T_{add}$ value. Of course, although the Node B can provide time offset information other than the $T_{all}$ value and the $T_{add}$ value, the invention will be described with reference to a case where the $T_{all}$ value and the $T_{add}$ value are used, for convenience sake.

In the embodiment of the present invention, the $T_{add}$ value for controlling an additional delay value, i.e., a transmission start point of the UL DPCH is calculated by $$T_{add}+T_{all}+T_{off}-T_0=T_{all}-2*PD \qquad (2)$$

In Equation (2), the $T_{add}$ value is a time control value to be additionally considered by the UE during transmission of the UL DPCH, the $T_0$ time after the UE receives the DL DPCH. Here, the time control value $T_{add}$ is calculated when the UE first establishes a radio link. That is, it is assumed in Equation (2) that the PD value is determined during transmission of the RACH, and the UE has not previously transmitted and received the DPCH. Therefore, the $T_{add}$ value can be calculated in another way when the UE starts the USTS service while transmitting and receiving the DPCH, and in the embodiment, this value is defined as USTS offset which is transmitted during the handover. In the handover process where the UE simultaneously uses a Node B using the USTS service and a Node B using the normal DPCH, time control (time alignment) must be performed like in the UE3, when the UE ends the USTS service in the Node B having provided the USTS service and starts the USTS service in the Node B using the normal DPCH.

The time control process will be described with reference to the UE3 of FIG. 17. The time difference between the point 506 and the point 507 is determined based on the location of the UE3 in the cell of the Node B2. Since this value is determined after being time-controlled with the $T_{all,1}$ by the UE3 for the USTS service in the Node B1, it is not possible to perform synchronization for the USTS service in the Node B2 with the $T_{add}$ value. Therefore, the Node B2 should personally calculate the time difference between the point 506 and the point 507. The time difference between the point 506 and the point 507 will be defined as $T_{draft}$. The $T_{draft}$ represents a time difference between the reception point of the UL DPCH and the DL DPCH transmission point plus the $T_0$. The sum of the $T_{draft}$ value and the $T_0$ value can be calculated by the Node B2 based on the RTT (Round Trip Time) value. The RTT value, as stated above, represents the time difference between the reception point of the UL DPCH and the transmission point of the DL DPCH. Therefore, the $T_{draft}$ can be defined as $$T_{draft} = RTT - T_0$$

When the UE3 desires to start the USTS service in the Node B2, the Node B2 performs USTS synchronization using its $T_{all}$ value ($T_{all,2}$ in FIG. 17). In this case, it is necessary to calculate a value $T_{delta}$ defined as $$T_{delta} = T_{all} - T_{draft}$$

(Case 3.1) $T_{delta}$ Being a Positive Number

When the $T_{delta}$ value is a positive number, the Node B transmits the $T_{delta}$ value as the USTS offset, so that the UE can shift (control) the UL DPCH transmission point to behind the $T_{delta}$ time. Here, $L_0$ and $T_{delta0}$ are defined as $L_0$=max ($k$: $T_{delta}-k*256 \geq 0$, k is an integer larger than or equal to '0')

$$T_{delta0} = T_{delta} - L_0 * 256 \qquad (3)$$

In Equation (3), $T_{delta0}$ has a value between 0 and 256 ($T_{delta0} = T_{delta}$ mod 256). The Node B can transmit either the $T_{delta}$ value or the $L_0$ and $T_{delta0}$ values to the UE. Upon receiving the $L_0$ value and the $T_{delta0}$ value, the UE can calculate the $T_{delta}$ value using a formula $T_{delta} = L_0 * 256 + T_{delta0}$.

(Case 3.2) $T_{delta}$ Being a Negative Number

When the $T_{delta}$ value is a negative number, the transmission point of the UE must be advanced by an absolute value of the $T_{delta}$ value. However, if the transmission point is advanced, there is a probability that the data on the previously transmitted UL DPCH will be lost. Thus, there is a demand for a new time control method. In the new time control method, L is defined as L=min ($k$: $k*256+T_{delta} \geq 0$, k is an integer larger than or equal to '0').

That is, the L value is a quotient obtained by dividing by 256 the smallest value among multiples of 256, being larger than or equal to the $T_{delta}$ value. A $T_{delta1}$ value will be defines as $$T_{delta1} = L*256 + T_{delta}$$

The $T_{delta1}$ value has a value between 0 and 256. Therefore, the Node B can control the UL DPCH transmission point of the UE by transmitting the $T_{delta1}$ value and the L value as the USTS offset. That is, the UE transmits the UL DPCH by shifting the UL DPCH transmission point to behind the Tdelta1 value.

Therefore, if the $T_{delta}$ value is a positive value in the above formula, the Node B transmits the intact $T_{delta}$ value to the UE as the USTS offset value. However, if the $T_{delta}$ value is a negative value, the Node B transits the $T_{delta1}$ value to the UE as the USTS offset value, instead of the $T_{delta}$ value. Upon receiving the $T_{delta}$ value and the $T_{delta1}$ value as the USTS offset value, the UE transmits the UL DPCH after delaying the transmission point by as much as the USTS offset value. Although the invention has been described with reference to an embodiment in which the $T_{delta}$ value has a value between 0 and 256, the $T_{delta}$ value can be larger than 256, if the definition on the L value is changed to, for example, L=min (k: $k*256*m+T_{delta} \geq 0$, m is a predetermined integer larger than '1'). The present invention has been described with reference to an embodiment where the L value is defined as L=min (k: $k*256+T_{delta} \geq 0$), and the invention can be implemented in a similar manner even for the other L values.

Figure 18:
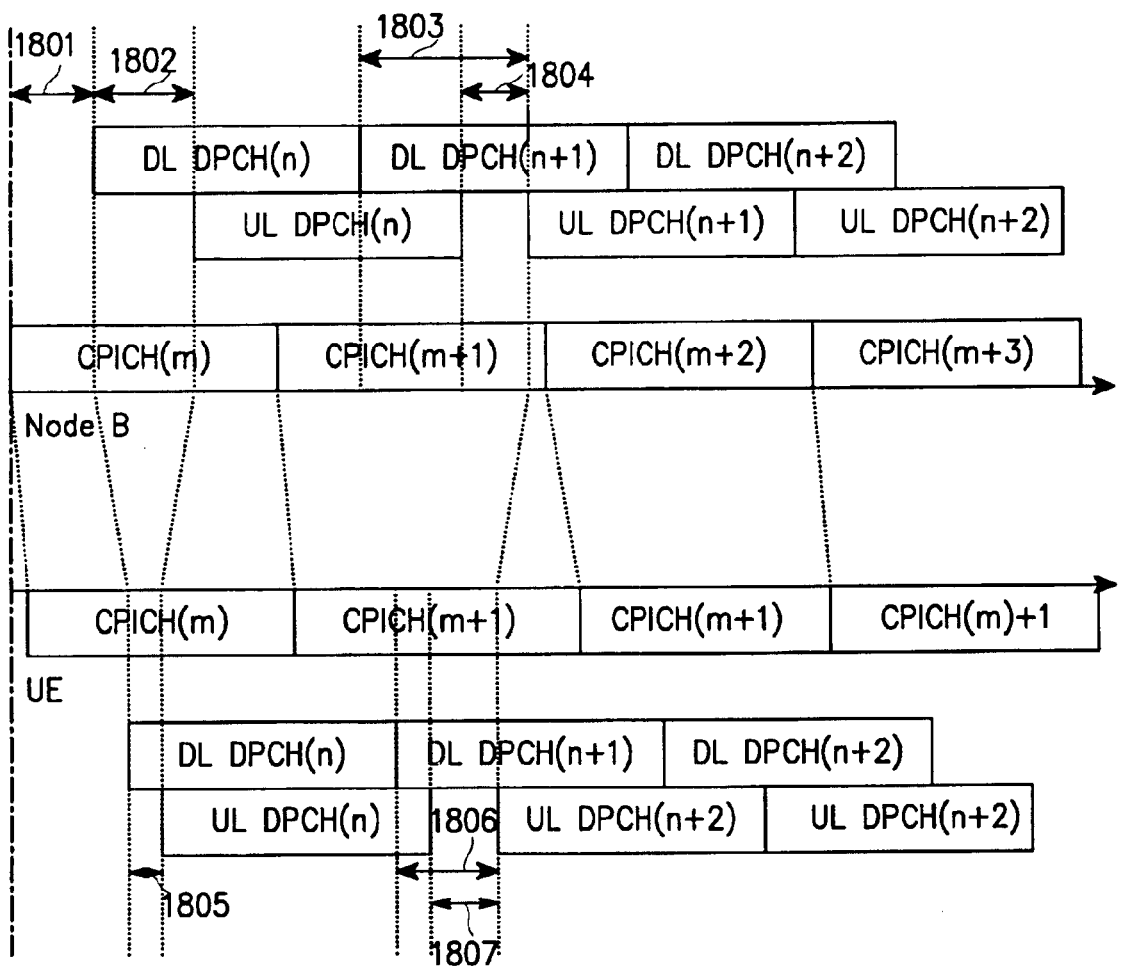
FIG. 18 illustrates a method for controlling synchronization of the UL DPCH considering only a change in a transmission point of the UE.

FIG. 18 illustrates a method for controlling synchronization of the UL DPCH considering only a change in a transmission point of the UE, and in particular, a method for controlling synchronization of the UL DPCH using the $T_{delta}$ value, the $T_{delta1}$ value and the L value, considering only the change in the transmission point of the UE.

In FIG. 18, reference numeral 1801 represents a frame offset between CPICH and DL DPCH. The frame offset 1801 is represented by $\tau_{DPCH,n}$ and is determined when the DPCH is assigned. The $\tau_{DPCH,n}$ value is determined by the CRNC when a new radio link is established, and the $\tau_{DPCH,n}$ value is defined as a Frame offset value and a Chip offset value considering a transmission time of the existing radio link when the radio link is added in the handover process. The detailed description of this value will be omitted for simplicity. The $\tau_{DPCH,n}$ value is provided to the Node B during a handover, and the Node B determines the transmission point of the DL DPCH using this value.

Upon receiving DL DPCH(n), the UE transmits a UL DPCH(n) frame after a lapse of a time represented by reference numeral 1805. The time 1805 represents a time offset between a reception point of the DL DPCH and a transmission point of the UL DPCH, and also represents the $T_0$ value of the normal DPCH. In the case of the UE employing the USTS, the time 1805 is equal to $T_0 + T_{add}$. Herein, a description will be made of a change in the time 1805 when the UE having transmitted the normal DPCH in the handover process starts the USTS service. Reference numeral 1802 represents a time offset between a point where the Node B transmits the DL DPCH and a point where the Node B receives the UL DPCH. In the case of the normal DPCH, the time offset value 1802 is the sum of the $T_0$ value and the round trip time 2*PD, or the RTT value. In the case of the UE using the USTS, the time offset value 1802 can be equal to $T_0 + T_{all}$. The change in the time offset value 1802 will be described with reference to FIG. 18.

When the UE switches from the non-USTS mode, where it transmits the normal DPCH, to the USTS mode, the UE transmits the UL DPCH after delaying the UL DPCH by as much as the $T_{delta}$ value as stated above. Reference numeral 1806 represents a change in transmission time of the UL DPCH during transmission of a UL DPCH(n+1) frame where the USTS service is started. The value 1806 can be equal to the value $T_{delta}$ or the value $L*256+T_{delta}$. That is, the UE changes the transmission point of the UL DPCH based on the $T_{delta}$ value and the L value transmitted from the Node B. Reference numeral 1803 represents a time offset between the transmission point of the DL DPCH(n+1) and the reception point of the UL DPCH(n+1). This value can be defined as RTT, like the value 1801. However, the value 1803 has a value different from the value 1801 due to the time control for the USTS. The value 1803 can have a value different by as much as a multiple of 256, as compared with the value 1801. This results from the change in the transmission time due to the time control of the UE based on the $T_{delta}$ value and the L value. The difference between the value 1801 and the value 1803 is identical to the L value used in the synchronization process for a time 1806. Reference numeral 1804 represents a time difference between the UL DPCH(n) and the UL DPCH(n+1), and reflects a change in the transmission time of the UL DPCH due to the time control caused by the USTS service mode switching of the UE. The value 1804 is equal to a value 1807 or slightly different from the value 1807 when an instantaneous shift is considered. Therefore, the UE transmits the next UL DPCH (n+1) frame by delaying the transmission point by as much as the value 1807 after transmitting the UL DPCH(n) frame, and the Node B receives the UL DPCH(n+1) frame after a lapse of the time value 1804 after receiving the UL DPCH (n).

Figure 19:
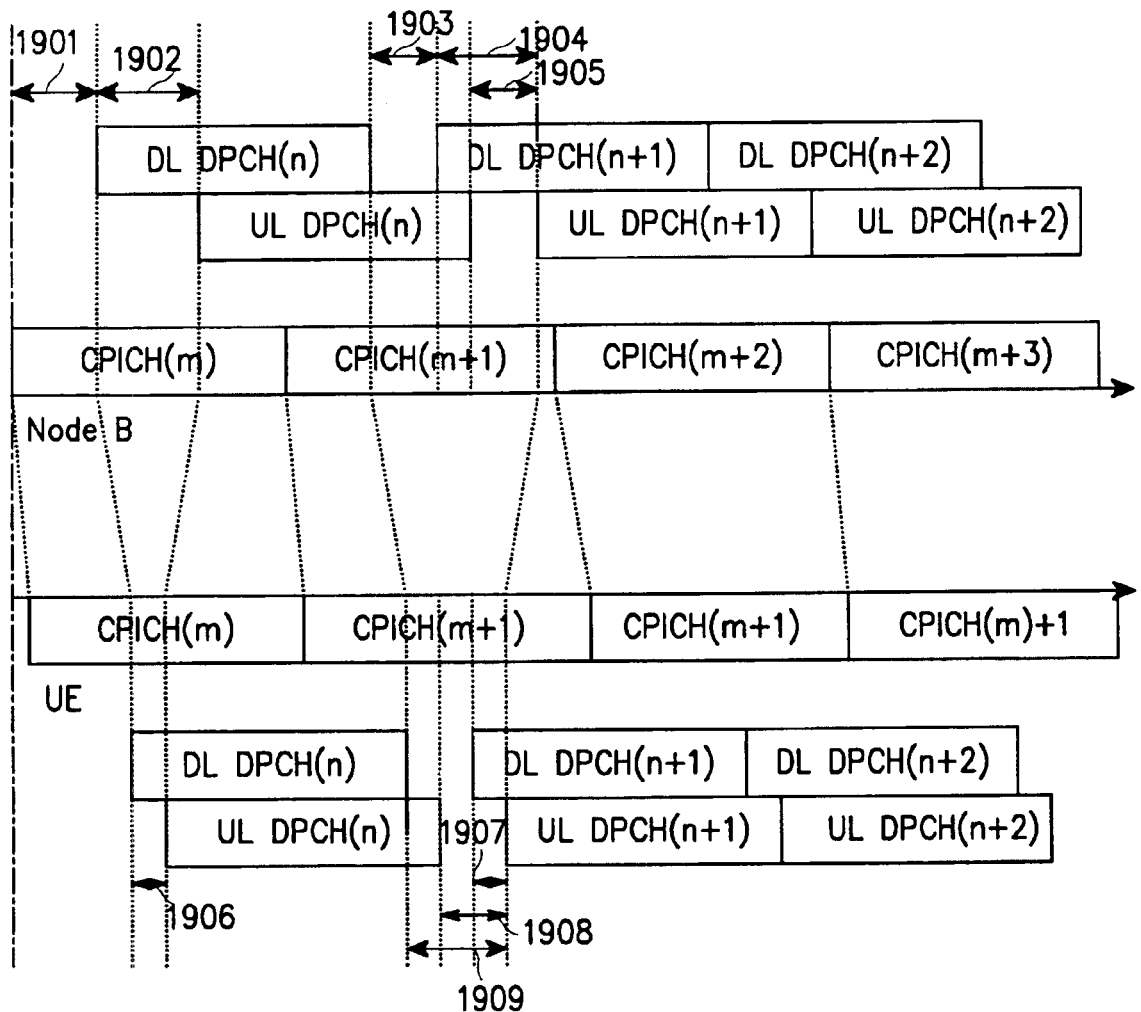
FIG. 19 illustrates a method for controlling synchronization of the UL DPCH considering both the time of the UE and the time of the Node B.

FIG. 19 illustrates a method for controlling synchronization of the UL DPCH considering both the time of the UE and the time of the Node B, and in particular, a method for controlling synchronization of the UL DPCH using the $T_{delta}$ value, the $T_{delta1}$ value and the L value, considering both the time of the UE and the time of the Node B. FIG. 19 illustrates a state where only the change in the time of the DL DPCH of FIG. 18 is controlled.

Reference numerals 1901, 1902 and 1906 of FIG. 19 have the same values as the reference numerals 1801, 1802 and 1805 of FIG. 18, respectively. Reference numeral 1903 represents a value when the Node B transmits DL DPCH by delaying the transmission point by as much as L*256-chip time by applying the L value considered for USTS service switching during transmission of the DL DPCH(n+1). That is, the value 1903 can be equal to the L value used in FIG. 18. In this case, reference numeral 1904 represents a value indicating a time difference between the transmission point of the DL DPCH(n+1) and the reception point of the UL DPCH(n+1), and this value maintains the value $T_0+T_{all}$. The sum (1903+1904) of the value 1903 and the value 1904 is equal to the sum of the RTT value represented by the reference numeral 1902 and the $T_{delta1}$ value used when the UE transmits the UL DPCH(n+1). The sum 1903+1904 is represented by $$1903+1904=RTT+T_{delta1} \quad (4)$$

In Equation (4), $RTT=T_{draft}+T_0=T_{all}-T_{delta}+T_0$, and $T_{delta1}$ is defined as $L*256+T_{delta}$. Therefore, 1903+1904= $RTT+T_{delta1}=T_{all}-T_{delta}+T_0+L*256+T_{delta}=T_{all}+T_0+L*256$. This value can be verified based on the fact that 1903=$L*256$ and 1904=$T_0+T_{all}$.

Reference numeral 1905 having the same value as reference numeral 1908, represents a time difference between the UL DPCH(n) and the UL DPCH(n+1). The reference numeral 1905 or 1908 having the same value as the reference numeral 1804 or 1806 of FIG. 18, has a value determined based on the $T_{delta}$ value and the $T_{delta1}$ value. The reference numeral 1908 represents the $T_{delta1}$ value.

Therefore, if the $T_{delta}$ value is a positive number, the SRNC transmits the value of L=0 and the value of USTS offset=$T_{delta}$. However, if the $T_{delta}$ value is a negative number, the SRNC transmits the L value and the value of USTS offset=$T_{delta1}$ to the UE. Upon receiving the L value and the USTS offset value, the UE transmits the UL DPCH after delaying its transmission point using the USTS offset value and acquires reception synchronization of the DL DPCH using the L value. The SRNC transmits the L value to the Node B and, upon receiving the L value, the Node B transmits the DL DPCH after delay of L*256 chips using the L value, and then receives the UL DPCH after a lapse of $T_0+T_{all}$ from the transmission point of the DL DPCH. The method of exchanging the L value and the USTS offset value among the Node B, the SRNC, the DRNC and the UE is performed in the same process as performed in the second embodiment of the present invention. When the USTS offset is transmitted from the SRNC to the UE, the L value, the $T_{delta}$ value and the $T_{delta1}$ value are transmitted along with the USTS offset information. Further, when the USTS offset is from the SRNC to the Node B, the L value is transmitted along with the USTS offset information. That is, the USTS offset information exchanged in the second embodiment of FIGS. 14 and 15 includes the L value. As described above, the USTS offset is determined by the Node B, and then transmitted to the SRNC in the process of FIGS. 14 and 15. However, when the Node B previously transmits the RTT information, the SRNC can previously determine the USTS offset and transmit the determined USTS offset to the Node B. In this case, the Node b performs synchronization using the USTS offset provided from the SRNC.

In this embodiment, when the Node B has already recognized the value 1906 of FIG. 19, it may transmit a value 1907 to the UE, instead of the $T_{delta}$ value or the $T_{delta1}$ value. Upon receiving the value 1907, the UE transmits the UL DPCH after a lapse of the value 1907 from the reception point of the DL DPCH. The value 1907 is equivalent to the $T_{add}$ value. The value 1906 represents a time difference between a point where the UE receives the DL DPCH prior to synchronization for the start of the USTS service and a point where the UE transmits the UL DPCH. The value 1906 is identical to the $T_0$ value when the UE transmits the normal DPCH. However, when the UE exchanges the normal DPCH with another cell while maintaining the USTS service with the cell, the value 1906 has a value of $T_0+T_{add}$+alpha. The $T_{add}$ value is an offset value given during the USTS service operation, while the alpha value is an offset value changed in the tracking process. Therefore, the value 1906 can be a value determined depending on the service that the UE has been previously provided with. When the SRNC has already recognized the value 1906, the value 1907 is calculated by $$1907=T_{all}+T_0-(RTT-1906)$$

In the above formula, (RTT−1906) represents a round trip time.

The UE performs scrambling synchronization along with the above-stated synchronization. As described above, in the scrambling synchronization process, the UE transmits the UL DPCH by applying a scrambling offset offset$_{sc}$, using the USTS offset information received from the Node B. The offset$_{sc}$ value, as stated above, is defined as $$\text{offset}_{sc}=\tau_{DPCH,n}+T_0+T_{all}$$

It is noted that the $\tau_{DPCH,n}$ is defined as a new value when the UE is switched from the normal DPCH mode to the USTS service mode. That is, it could be understood that as the DL DPCH is shifted by L*256 chips, the $\tau_{DPCH,n}$ value is defined as $\tau_{DPCH,n}=\tau_{DPCH,n}+L*256$ chips. Therefore, the offset$_{sc}$ value is changed depending on the L value, as follows:

$$\text{offset}_{sc}=\tau_{DPCH,n}+T_0+T_{all}=\tau_{DPCH,n}+L*256+T_0+T_{all}$$

Therefore, the L value and the $T_{all}$ value should be transmitted from the SRNC to the UE, and upon receiving the offset$_{sc}$ value, the UE performs the scrambling synchronization process using the received offset$_{sc}$ value. Accordingly, the $T_{all}$ value as well as the L value must be transmitted from the SRNC to the UE along with the USTS offset information, in the process of FIG. 14.

As can be appreciated from the foregoing description, when the CDMA communication system supports the USTS mode where a plurality of UEs use a single scrambling code, the system can implement slot and frame synchronizations between the UEs using the same single scrambling code. Here, the respective DL DPCHs have different propagation delay values, so that the UL DPCHs may not be synchronized with each other. The system, however, can synchronize the UL DPCHs with one another in the initial synchronization process.

A UE using the USTS service can implement a handover while maintaining the USTS service even in a target cell, to thereby continue the USTS service. Furthermore, a data communication service is provided suitably for a cell by allowing a UE to transition from a normal mode or a non-USTS mode to a USTS mode.

In addition, in a state where the UE simultaneously communicates with a first Node B operating in the USTS mode and a second Node B operating in the non-USTS mode, the second Node B provides the USTS service to the UE by controlling transmission and reception points of the UL DPCH and the DL DPCH, thus increasing power control efficiency and decreasing a data loss.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for switching an operation mode from a non-USTS (Uplink Synchronous Transmission Scheme) to a USTS mode in a Node B capable of communicating with a UE (User Equipment) in both the non-USTS mode and the USTS mode, comprising the steps of:

calculating a difference value between a start point of a downlink dedicated channel frame in a downlink dedicated channel transmitted to the UE in the non-USTS mode and a start point of an uplink dedicated channel frame in an uplink dedicated channel received from the UE;

determining a first control value for controlling the start point of the uplink dedicated channel frame in the uplink dedicated channel from the UE by comparing the difference value with a given reference value;

determining a second control value such that the second control value for the start point of the downlink dedicated channel frame in the downlink dedicated channel of the Node B becomes a multiple of a given number of chips;

informing the UE of the determined first and second control values; and transmitting a downlink dedicated channel signal such that the start point of the downlink dedicated channel frame becomes a start point determined based on the second control value.

2. The method as claimed in claim 1, wherein the reference value is a common delay time for uplink dedicated physical channels from UEs belonging to the Node B.

3. The method as claimed in claim 2, wherein the common delay time is a value shared by all of the UEs using a same cell or a same USTS scrambling code, and is set such that uplink dedicated physical channel signals received at the Node B from the UEs have a specific delay.

4. The method as claimed in claim 1, wherein the given number of chips is 256.

5. The method as claimed in claim 1, wherein the dedicated channel is a dedicated physical channel.

6. A method for connecting with a Node B in a USTS mode by a UE operating in a non-USTS mode in a cell region of the Node B, comprising the steps of:

receiving from the Node B a first control value for controlling a frame start point for an uplink dedicated channel signal and a second control value for controlling a frame start point for a downlink dedicated channel signal;

receiving a frame for the downlink dedicated channel signal from the Node B based on the second control value; and transmitting the uplink dedicated channel signal frame to the Node B based on the first control value, after receiving the downlink dedicated channel signal frame.

7. The method as claimed in claim 6, wherein the first control value is used for controlling a start point of the uplink dedicated channel frame of the UE by comparing: (a) a difference value between a start point of an uplink dedicated channel frame transmitted to the Node B in the non-USTS mode and a start point of a downlink dedicated channel frame transmitted from the Node B, with (b) a reference value previously given to the Node B.

8. The method as claimed in claim 6, wherein the second control value is used for controlling a start point of the downlink dedicated channel frame from the Node B to become a multiple of a given number of chips.

9. The method as claimed in claim 6, wherein the dedicated channel is a dedicated physical channel.

10. The method as claimed in claim 8, wherein the given number of chips is 256.

* * * * *